(12) United States Patent
Hampel et al.

(10) Patent No.: US 11,540,211 B2
(45) Date of Patent: Dec. 27, 2022

(54) TECHNIQUES FOR INTEGRATED ACCESS AND BACKHAUL CAPABILITY INDICATION

(71) Applicant: QUALCOMM Incorporated, San Diego, CA (US)

(72) Inventors: Karl Georg Hampel, Hoboken, NJ (US); Luis Fernando Brisson Lopes, Swindon (GB); Luca Blessent, Whitehouse Station, NJ (US); Navid Abedini, Somerset, NJ (US); Jianghong Luo, Skillman, NJ (US); Tao Luo, San Diego, CA (US); Junyi Li, Chester, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 57 days.

(21) Appl. No.: 17/028,531

(22) Filed: Sep. 22, 2020

(65) Prior Publication Data
US 2021/0092674 A1 Mar. 25, 2021

Related U.S. Application Data

(60) Provisional application No. 62/905,825, filed on Sep. 25, 2019.

(51) Int. Cl.
*H04W 48/16* (2009.01)
*H04W 76/10* (2018.01)
(Continued)

(52) U.S. Cl.
CPC ......... *H04W 48/16* (2013.01); *H04L 41/0803* (2013.01); *H04W 76/10* (2018.02); *H04W 16/32* (2013.01)

(58) Field of Classification Search
CPC ... H04W 84/047; H04W 92/20; H04W 40/22; H04W 24/02; H04W 88/04;
(Continued)

(56) References Cited

U.S. PATENT DOCUMENTS

2019/0021084 A1  1/2019 Stirling-Gallacher et al.
2019/0349834 A1* 11/2019 Teyeb .................. H04W 84/18
(Continued)

FOREIGN PATENT DOCUMENTS

CN          109257212 A  *  1/2019
WO     WO-2019194596 A1 * 10/2019 ............. H04B 7/155
(Continued)

OTHER PUBLICATIONS

Huawei: "Support for IAB", 3GPP Draft, 3GPP TSG RAN WG3 Meeting #105, R3-194800, BL CR to 38.401 Support for IAB, 3rd Generation Partnership Project (3GPP), Mobile Competence Centre, 650, Route Des Lucioles, F-06921 Sophia-Antipolis Cedex, France, vol. RAN WG3. No. Ljubljana, Slovenia, Aug. 26, 2019-Aug. 30, 2019, Sep. 18, 2019 (Sep. 18, 2019), XP051783063, 10 Pages, Retrieved from the Internet: URL: http://www.3gpp.org/ftp/tsg_ran/WG3_lu/TSGR3_105/Docs/R3-194800.zip. [retrieved on Sep. 18, 2019] p. 5-p. 7 p. 9-p. 10.
(Continued)

*Primary Examiner* — Daniel Lai
(74) *Attorney, Agent, or Firm* — Dalei Dong; Harrity & Harrity, LLP

(57) ABSTRACT

Various aspects of the present disclosure generally relate to wireless communication. In some aspects, a first node may transmit, to a second node, a first message providing a first indication of integrated access and backhaul (IAB) capability. The first node may receive, from the second node and in response to the first message, a second message providing a second indication of IAB capability. The first node may
(Continued)

establish an IAB capable connection with the second node based at least in part on the first message and the second message. Numerous other aspects are provided.

32 Claims, 14 Drawing Sheets

(51) Int. Cl.
*H04L 41/0803* (2022.01)
*H04W 16/32* (2009.01)

(58) Field of Classification Search
CPC ... H04W 88/085; H04W 88/14; H04W 76/19; H04W 72/0406; H04W 88/08; H04W 56/001; H04W 48/16; H04W 72/0426; H04W 36/08; H04W 24/04; H04W 76/10; H04W 40/12; H04W 76/18; H04W 36/0055; H04W 40/24; H04W 92/12; H04W 92/18; H04W 40/248; H04W 8/005; H04W 16/26; H04W 84/18; H04W 28/06; H04W 88/12; H04W 28/02; H04W 36/165; H04W 40/246; H04W 88/02; H04W 72/1226; H04W 76/00; H04W 28/24; H04W 36/0077; H04W 56/003; H04W 36/12; H04W 12/102; H04W 76/25; H04W 16/32; H04L 5/0091; H04L 5/0092; H04L 1/1819; H04L 2001/0097; H04L 41/12; H04L 1/00; H04L 1/08; H04L 41/0803; H04B 7/2606; H04B 7/15; H04B 17/40
See application file for complete search history.

(56) References Cited

U.S. PATENT DOCUMENTS

| | | | | |
|---|---|---|---|---|
| 2019/0394687 | A1* | 12/2019 | Kowalski | H04W 36/0061 |
| 2020/0146083 | A1* | 5/2020 | Wang | H04W 28/0252 |
| 2020/0196225 | A1* | 6/2020 | Wang | H04W 24/02 |
| 2021/0014782 | A1* | 1/2021 | Cui | H04W 48/16 |
| 2021/0126991 | A1* | 4/2021 | Huang | H04L 69/22 |
| 2021/0219368 | A1* | 7/2021 | Fujishiro | H04W 76/19 |

FOREIGN PATENT DOCUMENTS

| | | | | |
|---|---|---|---|---|
| WO | WO-2020088253 | A1 * | 5/2020 | |
| WO | WO-2020221304 | A1 * | 11/2020 | H04W 48/16 |
| WO | WO-2021006784 | A1 * | 1/2021 | H04W 40/22 |

OTHER PUBLICATIONS

International Search Report and Written Opinion—PCT/US2020/052171—ISA/EPO—dated Jan. 19, 2021.

Qualcomm Incorporated: et al., "Support for IAB in EPS", 3GPP Draft, 3GPP TSG-SA WG2 Meeting #135, S2-1909812, TS 23. 401, CR_General Description for Support of IAB_R1, 3rd Generation Partnership Project (3GPP), Mobile Competence Centre, 650, Route Des Lucioles, F-06921 Sophia-Antipolis, vol. SA WG2, No. Split Croatia, Oct. 14, 2019-Oct. 18, 2019, Oct. 4, 2019 (Oct. 4, 2019), XP051795898. 11 Pages, Retrieved from the Internet: URL: http://www.3gpp.org/ftp/tsg_sa/WG2_Arch/TSGS2_135_Split/Docs/S2-1909812.zip. [retrieved on Oct. 4, 2019] p. 8, line 51—p. 10, line 30.

Qualcomm Incorporated: "Summary for WI on Integrated Access and Backhaul", 3GPP Draft, RP-201757, 3rd Generation Partnership Project (3GPP), Mobile Competence Centre, 650, Route Des Lucioles, F-06921 Sophia-Antipolis Cedex, France, vol. TSG RAN, No. Electronic Meeting, Sep. 14, 2020-Sep. 18, 2020, Sep. 7, 2020 (Sep. 7, 2020), XP051931556, 4 Pages, Retrieved from the Internet: URL: https://ftp.3gpp.org/tsg_ran/TSG_RAN/TSGR_89e/Docs/RP-201757.zip. RP-201757-WI summary NR IAB.doc [retrieved-on-Sep. 7, 2020] Subsections 2.1-2.3.

RAN3: "LS on the IAB-Indication to Core Network", 3GPP Draft, SA WG2 Meeting #S2-135, S2-1908697_R3-194787, 3rd Generation Partnership Project (3GPP), Mobile Competence Centre, 650, Route Des Lucioles, F-06921 Sophia-Antipolis Cedex, France, vol. SA WG2, No. Split Croatia, Oct. 14, 2019-Oct. 18, 2019, Sep. 10, 2019 (Sep. 10, 2019), XP051800926, 2 Pages, Retrieved from the Internet URL: https://ftp.3gpp.org/Meetings_3GPP_SYNC/SA2/Docs/S2-1908697.zip.S2-1908697_R3-194787.doc [retrieved-on 2819-89-18] the whole document.

ZTE Corporation: et al., "Parent Node Selection in IAB", 3GPP Draft, 3GPP TSG-RAN WG3#105, R3-193652, 3rd Generation Partnership Project (3GPP), Mobile Competence Centre, 650, Route Des Lucioles, F-06921 Sophia-Antipolis Cedex, France, vol. RAN WG3, No. Ljubljana, lovenija, Aug. 26, 2019-Aug. 30, 2019, Aug. 17, 2019 (Aug. 17, 2019), XP051769856, 4 Pages, Retrieved from the Internet URL: http://www.3gpp.org/ftp/tsg_ran/WG3_Iu/TSGR3_105/Docs/R3-193652.zip. [retrieved on Aug. 17, 2019] Section 2.

* cited by examiner

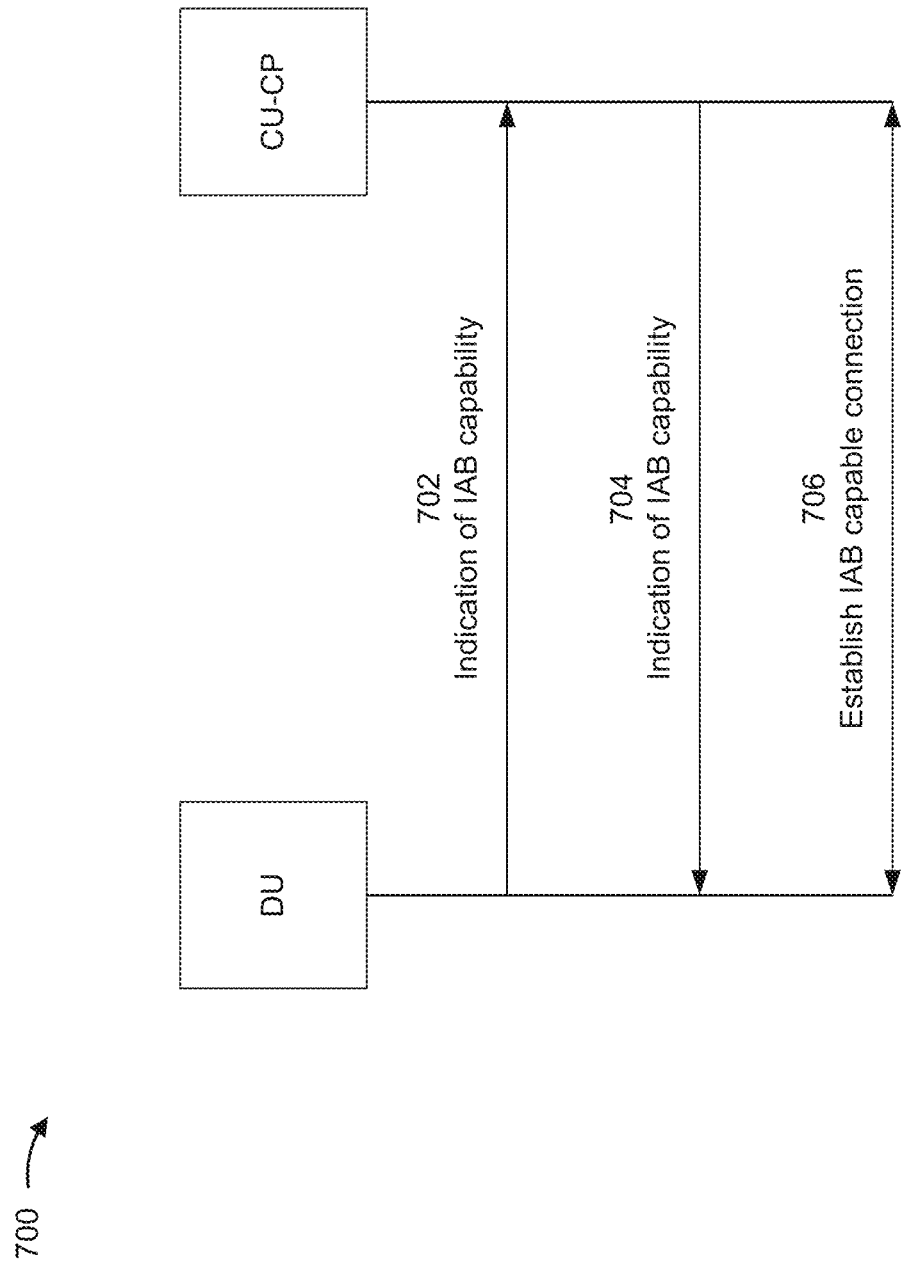

TECHNIQUES FOR INTEGRATED ACCESS AND BACKHAUL CAPABILITY INDICATION

CROSS-REFERENCE TO RELATED APPLICATION

This patent application claims priority to U.S. Provisional Patent Application No. 62/905,825, filed on Sep. 25, 2019, entitled "TECHNIQUES FOR INTEGRATED ACCESS AND BACKHAUL CAPABILITY INDICATION," and assigned to the assignee hereof. The disclosure of the prior application is considered part of and is incorporated by reference into this patent application.

FIELD OF THE DISCLOSURE

Aspects of the present disclosure generally relate to wireless communication and to techniques and apparatuses for integrated access and backhaul (IAB) capability.

DESCRIPTION OF RELATED ART

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, and/or the like.

The above multiple access technologies have been adopted in various telecommunication standards to provide a common protocol that enables different user equipment to communicate on a municipal, national, regional, and even global level. New Radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements should be applicable to other multiple access technologies and the telecommunication standards that employ these technologies.

SUMMARY

In some aspects, a method of wireless communication, performed by a first node, may include transmitting, to a second node, a first message providing a first indication of integrated access and backhaul (IAB) capability; receiving, from the second node and in response to the first message, a second message providing a second indication of IAB capability; and establishing an IAB capable connection with the second node based at least in part on the first message and the second message.

In some aspects, the first node and the second node are nodes of an IAB donor.

In some aspects, the first message or the second message further identifies one or more IAB capabilities. In some aspects, the one or more IAB capabilities include one or more of an air interface capacity, or a number of supported backhaul radio link control channels.

In some aspects, establishing the IAB capable connection includes activating IAB functionality for communications with the second node. In some aspects, the method further includes transmitting an IAB configuration based at least in part on establishing the IAB capable connection.

In some aspects, the first node is a distributed unit and the second node is a control-plane central unit. In some aspects, the first node is a control-plane central unit and the second node is a distributed unit. In some aspects, the first node is a user-plane central unit and the second node is a control-plane central unit. In some aspects, the first node is a control-plane central unit and the second node is a user-plane central unit.

In some aspects, the first message or the second message is at least one of a message of an F1 startup and cells activation procedure, or a message of a transport network layer associations establishment procedure. In some aspects, the first message or the second message is at least one of a message of an F1 setup procedure, a message of an F1 configuration update procedure, or a message of an F1 status indication procedure. In some aspects, the first message or the second message is a message of an E1 setup procedure.

In some aspects, a method of wireless communication, performed by a first node, may include receiving, from a second node, a first message providing a first indication of IAB capability; transmitting, to the second node and in response to the first message, a second message providing a second indication of IAB capability; and establishing an IAB capable connection with the second node based at least in part on the first message and the second message.

In some aspects, the first node and the second node are nodes of an IAB donor.

In some aspects, the first message or the second message further identifies one or more IAB capabilities. In some aspects, the one or more IAB capabilities include one or more of an air interface capacity, or a number of supported backhaul radio link control channels.

In some aspects, establishing the IAB capable connection includes activating IAB functionality for communications with the second node. In some aspects, the method further includes transmitting an IAB configuration based at least in part on establishing the IAB capable connection.

In some aspects, the first node is a distributed unit and the second node is a control-plane central unit. In some aspects, the first node is a control-plane central unit and the second node is a distributed unit. In some aspects, the first node is a user-plane central unit and the second node is a control-plane central unit. In some aspects, the first node is a control-plane central unit and the second node is a user-plane central unit.

In some aspects, the first message or the second message is at least one of a message of an F1 startup and cells activation procedure, or a message of a transport network layer associations establishment procedure. In some aspects, the first message or the second message is at least one of a message of an F1 setup procedure, a message of an F1 configuration update procedure, or a message of an F1 status indication procedure. In some aspects, the first message or the second message is a message of an E1 setup procedure.

In some aspects, a first node for wireless communication may include memory and one or more processors operatively coupled to the memory. The memory and the one or more processors may be configured to transmit, to a second node, a first message providing a first indication of IAB capability; receive, from the second node and in response to the first message, a second message providing a second indication of IAB capability; and establish an IAB capable connection with the second node based at least in part on the first message and the second message.

In some aspects, a first node for wireless communication may include memory and one or more processors operatively coupled to the memory. The memory and the one or more processors may be configured to receive, from a second node, a first message providing a first indication of IAB capability; transmit, to the second node and in response to the first message, a second message providing a second indication of IAB capability; and establish an IAB capable connection with the second node based at least in part on the first message and the second message.

In some aspects, a non-transitory computer-readable medium may store one or more instructions for wireless communication. The one or more instructions, when executed by one or more processors of a first node, may cause the one or more processors to: transmit, to a second node, a first message providing a first indication of IAB capability; receive, from the second node and in response to the first message, a second message providing a second indication of IAB capability; and establish an IAB capable connection with the second node based at least in part on the first message and the second message.

In some aspects, a non-transitory computer-readable medium may store one or more instructions for wireless communication. The one or more instructions, when executed by one or more processors of a first node, may cause the one or more processors to: receive, from a second node, a first message providing a first indication of IAB capability; transmit, to the second node and in response to the first message, a second message providing a second indication of IAB capability; and establish an IAB capable connection with the second node based at least in part on the first message and the second message.

In some aspects, an apparatus for wireless communication may include means for transmitting, to a node, a first message providing a first indication of IAB capability; means for receiving, from the node and in response to the first message, a second message providing a second indication of IAB capability; and means for establishing an IAB capable connection with the node based at least in part on the first message and the second message.

In some aspects, an apparatus for wireless communication may include means for receiving, from a node, a first message providing a first indication of IAB capability; means for transmitting, to the node and in response to the first message, a second message providing a second indication of IAB capability; and means for establishing an IAB capable connection with the node based at least in part on the first message and the second message.

Aspects generally include a method, apparatus, system, computer program product, non-transitory computer-readable medium, user equipment, base station, wireless communication device, and/or processing system as substantially described herein with reference to and as illustrated by the accompanying drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIGS. 7A-7D are diagrams illustrating examples of IAB capability indication, in accordance with various aspects of the present disclosure.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with 3G and/or 4G wireless technologies, aspects of the present disclosure can be applied in other generation-based communication systems, such as 5G and later, including NR technologies.

Figure 1:
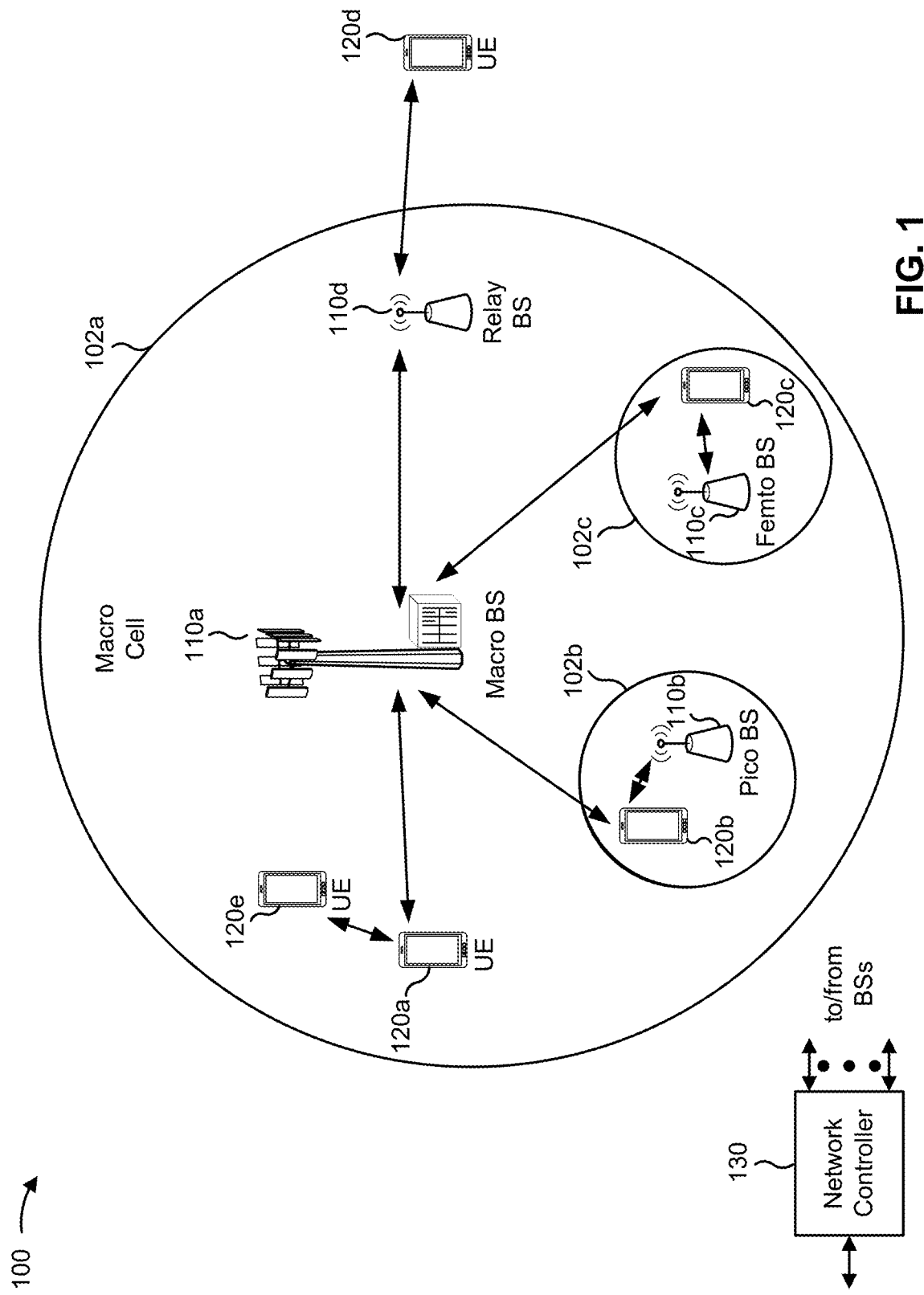
FIG. 1 is a diagram illustrating an example of a wireless communication network, in accordance with various aspects of the present disclosure.

FIG. 1 is a diagram illustrating a wireless network 100 in which aspects of the present disclosure may be practiced. The wireless network 100 may be an LTE network or some other wireless network, such as a 5G or NR network. The wireless network 100 may include a number of BSs 110 (shown as BS 110a, BS 110b, BS 110c, and BS 110d) and other network entities. A BS is an entity that communicates with user equipment (UEs) and may also be referred to as a base station, a NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay base station 110d may communicate with macro BS 110a and a UE 120d in order to facilitate communication between BS 110a and UE 120d. A relay base station may also be referred to as a relay BS, a relay station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components, memory components, and/or the like.

In general, any number of wireless networks may be deployed in a given geographic area. Each wireless network may support a particular RAT and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the base station 110.

As indicated above, FIG. 1 is provided as an example. Other examples may differ from what is described with regard to FIG. 1.

Figure 2:
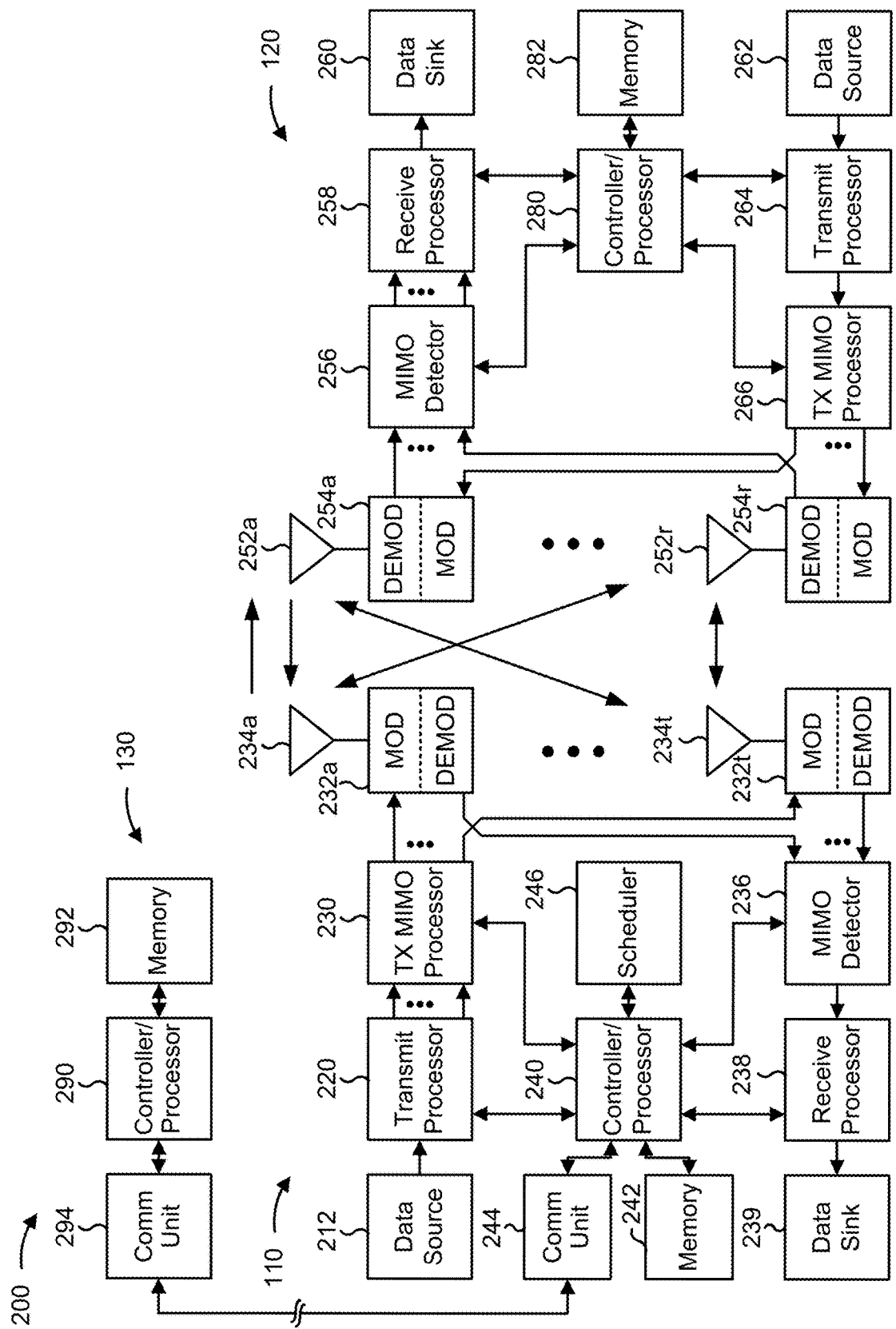
FIG. 2 is a diagram illustrating an example of a base station in communication with a UE in a wireless communication network, in accordance with various aspects of the present disclosure.

FIG. 2 shows a block diagram of a design 200 of base station 110 and UE 120, which may be one of the base stations and one of the UEs in FIG. 1. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like. In some aspects, one or more components of UE 120 may be included in a housing.

On the uplink, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

Controller/processor 240 of base station 110, controller/processor 280 of UE 120, and/or any other component(s) of FIG. 2 may perform one or more techniques associated with IAB capability indication, as described in more detail elsewhere herein. For example, controller/processor 240 of base station 110, controller/processor 280 of UE 120, and/or any other component(s) of FIG. 2 may perform or direct operations of, for example, process 800 of FIG. 8, process 900 of FIG. 9, and/or other processes as described herein. Memories 242 and 282 may store data and program codes for base station 110 and UE 120, respectively. In some aspects, memory 242 and/or memory 282 may comprise a non-transitory computer-readable medium storing one or more instructions for wireless communication. For example, the one or more instructions, when executed by one or more processors of the base station 110 and/or the UE 120, may perform or direct operations of, for example, process 800 of FIG. 8, process 900 of FIG. 9, and/or other processes as described herein. A scheduler 246 may schedule UEs for data transmission on the downlink and/or uplink.

In some aspects, a first node (e.g., base station 110) may include means for transmitting, to a second node, a first message providing a first indication of IAB capability, means for receiving, from the second node and in response to the first message, a second message providing a second indication of IAB capability, means for establishing an IAB capable connection with the second node based at least in part on the first message and the second message, and/or the like. In some aspects, a first node (e.g., base station 110) may include means for receiving, from a second node, a first message providing a first indication of IAB capability, means for transmitting, to the second node and in response to the first message, a second message providing a second indication of IAB capability, means for establishing an IAB capable connection with the second node based at least in part on the first message and the second message, and/or the like. In some aspects, such means may include one or more components of base station 110 described in connection with FIG. 2, such as antenna 234, DEMOD 232, MIMO detector 236, receive processor 238, controller/processor 240, transmit processor 220, TX MIMO processor 230, MOD 232, antenna 234, and/or the like.

As indicated above, FIG. 2 is provided as an example. Other examples may differ from what is described with regard to FIG. 2.

Figure 3:
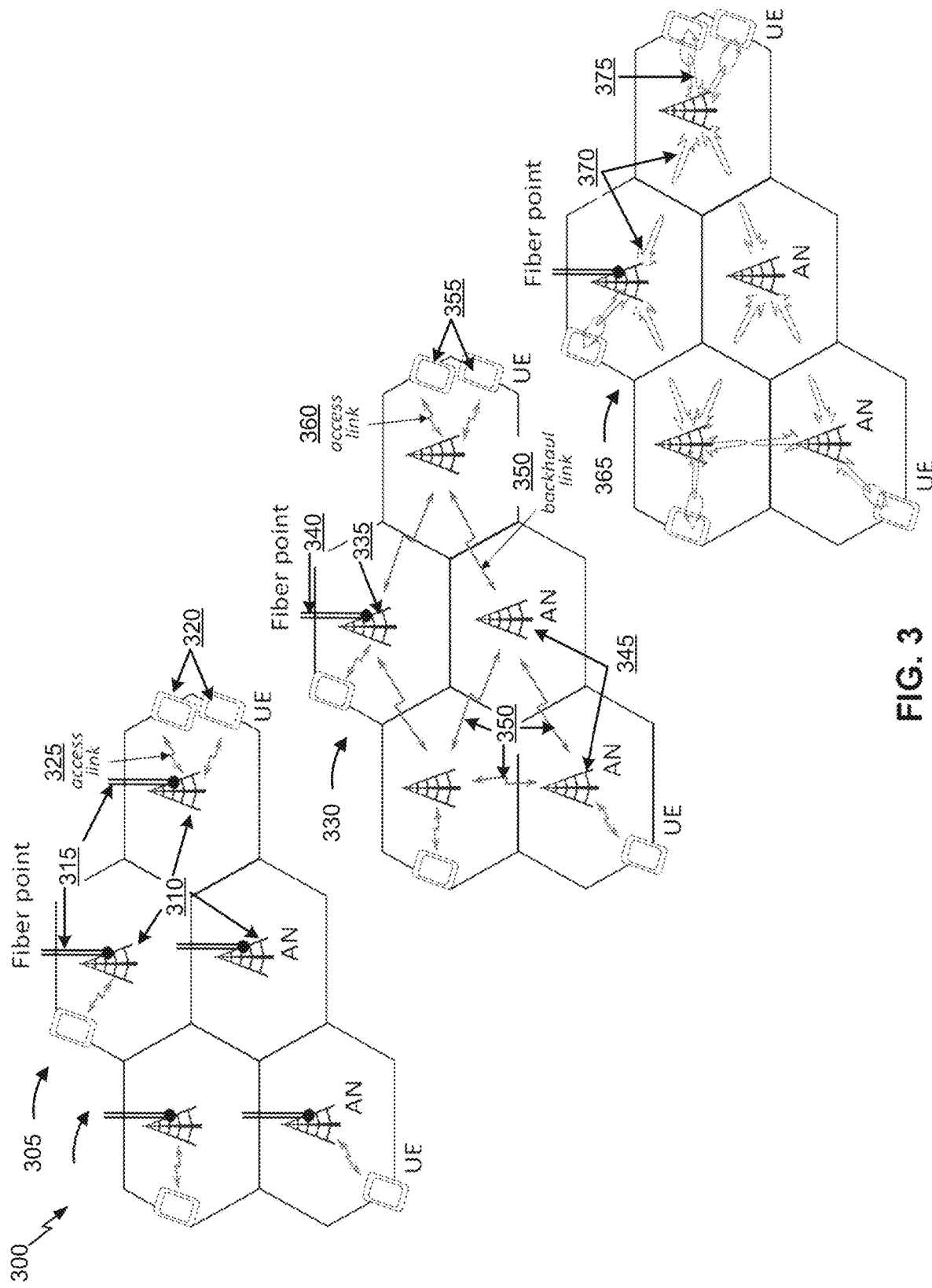
FIG. 3 is a diagram illustrating examples of radio access networks, in accordance with various aspects of the disclosure.

FIG. 3 is a diagram illustrating examples 300 of radio access networks, in accordance with various aspects of the disclosure.

As shown by reference number 305, a traditional (e.g., 3G, 4G, LTE, and/or the like) radio access network may include multiple base stations 310 (e.g., access nodes (AN)), where each base station 310 communicates with a core network via a wired backhaul link 315, such as a fiber connection. A base station 310 may communicate with a UE 320 via an access link 325, which may be a wireless link. In some aspects, a base station 310 shown in FIG. 3 may be a base station 110 shown in FIG. 1. In some aspects, a UE 320 shown in FIG. 3 may be a UE 120 shown in FIG. 1.

As shown by reference number 330, a radio access network may include a wireless backhaul network, sometimes referred to as an integrated access and backhaul (IAB) network. In an IAB network, at least one base station is an anchor base station 335 that communicates with a core network via a wired backhaul link 340, such as a fiber connection. An anchor base station 335 may also be referred to as an IAB donor (or IAB-donor). The IAB network may include one or more non-anchor base stations 345, sometimes referred to as relay base stations or IAB nodes (e.g., IAB-nodes). The non-anchor base station 345 may communicate directly or indirectly with the anchor base station 335 via one or more backhaul links 350 (e.g., via one or more non-anchor base stations 345) to form a backhaul path to the core network for carrying backhaul traffic. Backhaul link 350 may be a wireless link. Anchor base station(s) 335 and/or non-anchor base station(s) 345 may communicate with one or more UEs 355 via access links 360, which may be wireless links for carrying access traffic. In some aspects, an anchor base station 335 and/or a non-anchor base station 345 shown in FIG. 3 may be a base station 110 shown in FIG. 1. In some aspects, a UE 355 shown in FIG. 3 may be a UE 120 shown in FIG. 1.

As shown by reference number 365, in some aspects, a radio access network that includes an IAB network may utilize millimeter wave technology and/or directional communications (e.g., beamforming and/or the like) for communications between base stations and/or UEs (e.g., between two base stations, between two UEs, and/or between a base station and a UE). For example, wireless backhaul links 370 between base stations may use millimeter wave signals to carry information and/or may be directed toward a target base station using beamforming and/or the like. Similarly, the wireless access links 375 between a UE and a base station may use millimeter wave signals and/or may be directed toward a target wireless node (e.g., a UE and/or a base station). In this way, inter-link interference may be reduced.

The configuration of base stations and UEs in FIG. 3 is shown as an example, and other examples are contemplated. For example, one or more base stations illustrated in FIG. 3 may be replaced by one or more UEs that communicate via a UE-to-UE access network (e.g., a peer-to-peer network, a device-to-device network, and/or the like). In this case, "anchor node" may refer to a UE that is directly in communication with a base station (e.g., an anchor base station or a non-anchor base station).

As indicated above, FIG. 3 is provided as an example. Other examples may differ from what was described with regard to FIG. 3.

Figure 4:
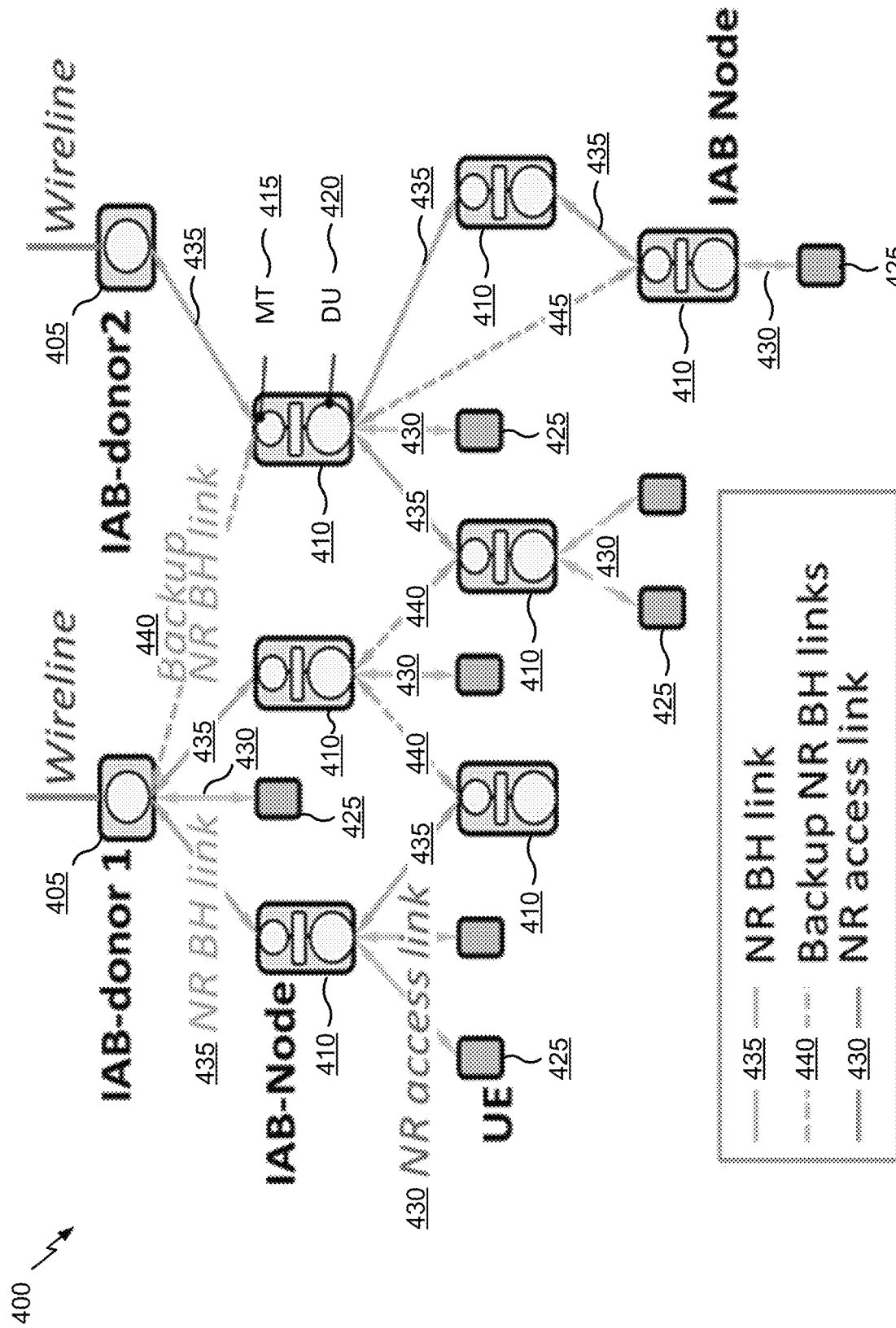
FIG. 4 is a diagram illustrating an example of an integrated access and backhaul (IAB) network architecture, in accordance with various aspects of the disclosure.

FIG. 4 is a diagram illustrating an example 400 of an IAB network architecture, in accordance with various aspects of the disclosure.

As shown in FIG. 4, an IAB network may include anchor nodes 405, or IAB donors (shown as IAB-donor), that connect to a core network via a wired connection (shown as wireline). For example, an Ng interface of an anchor node 405 may terminate at a core network. Additionally, or alternatively, an anchor node 405 may connect to one or more devices of the core network that provide a core access and mobility management function (AMF). In some aspects, an anchor node 405 may include a base station 110, such as an anchor base station, as described above in connection with FIG. 3. In some aspects, an anchor node 405 may be associated with a central unit (CU) which may perform access node controller (ANC) functions, AMF functions, and/or the like.

As further shown in FIG. 4, the IAB network may include non-anchor nodes 410, or IAB nodes (shown as IAB-Node). A non-anchor node 410 may provide IAB functionality, and may include mobile terminal (MT) functions 415 (also sometimes referred to as UE functions (UEF)) and distributed unit (DU) functions 420 (also sometimes referred to as access node functions (ANF)). The MT functions 415 may be controlled and/or scheduled by another non-anchor node 410 and/or an anchor node 405. The DU functions 420 may control and/or schedule other non-anchor nodes 410 and/or UEs 425 (e.g., which may correspond to UEs 120). In some aspects, an anchor node 405 may include only DU functions 420, and not MT functions 415. That is, an anchor node 405 may control and schedule communications with non-anchor nodes 410 and/or UEs 425. Additionally, or alternatively, a UE 425 may include only MT functions 415, and not DU functions 420. That is, communications of a UE 425 may be controlled and/or scheduled by an anchor node 405 and/or a non-anchor node 410.

When a first node controls and/or schedules communications for a second node (e.g., when the first node provides DU functions for the second node's MT functions), the first node may be referred to as a parent node of the second node, and the second node may be referred to as a child node of the first node. A child node of the second node may be referred to as a grandchild node of the first node. Thus, a DU function 420 of a parent node may control and/or schedule communications for child nodes of the parent node. A parent node may be an anchor node 405 or a non-anchor node 410, and the child node may be a non-anchor node 410 or a UE 425. Communications of an MT function 415 of a child node may be controlled and/or scheduled by a parent node of the child node.

As further shown in FIG. 4, a link between a UE 425 (e.g., which only has MT functions 415, and not DU functions 420) and an anchor node 405 or between a UE 425 and a non-anchor node 410 may be referred to as an access link 430. Access link 430 may be a wireless access link that provides a UE 425 with radio access to a core network via an anchor node 405, and optionally via one or more non-anchor nodes 410. Thus, the network illustrated in FIG. 4 may be referred to as a multi-hop IAB network.

As further shown in FIG. 4, a link between an anchor node 405 and a non-anchor node 410 or between two non-anchor nodes 410 may be referred to as a backhaul link 435. Backhaul link 435 may be a wireless backhaul link that provides a non-anchor node 410 with radio access to a core network via an anchor node 405, and optionally via one or more other non-anchor nodes 410. In some aspects, a backhaul link 435 may be a primary backhaul link (shown as backhaul link 435) or a secondary backhaul link 440 (e.g., a backup backhaul link). In some aspects, a secondary backhaul link 445 may be used if a primary backhaul link fails, becomes congested, becomes overloaded, and/or the like. Some propagation delay may be present between nodes, which may be mitigated using a timing advance (TA) value. Furthermore, some nodes may be associated with switching limitations, processing limitations, and/or the like, which may be mitigated using a timing assistance value, such as a delta value and/or the like.

As indicated above, FIG. 4 is provided as an example. Other examples may differ from what was described with regard to FIG. 4.

Figure 5:
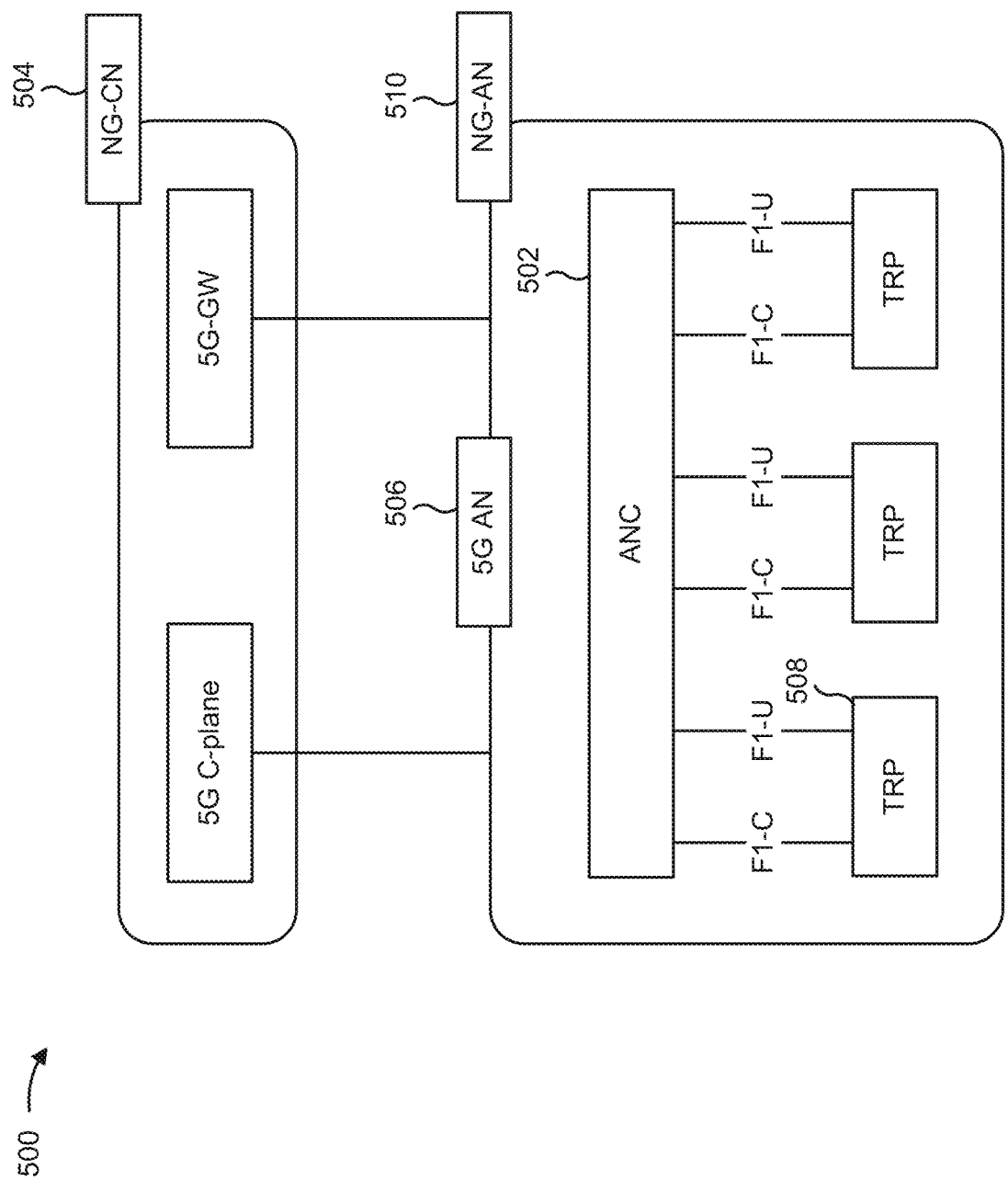
FIG. 5 illustrates an example logical architecture of a distributed radio access network (RAN), in accordance with various aspects of the present disclosure.

FIG. 5 illustrates an example logical architecture of a distributed RAN 500, according to aspects of the present disclosure. A 5G access node 506 may include an access node controller (ANC) 502. The ANC may be a central unit (CU) of the distributed RAN 500. The backhaul interface to the next generation core network (NG-CN) 504 may terminate at the ANC. The backhaul interface to neighboring next generation access nodes (NG-ANs) may terminate at the ANC. The ANC may include one or more TRPs 508 (which may also be referred to as BSs, NR BSs, Node Bs, 5G NBs, APs, gNB, or some other term). As described above, "TRP" may be used interchangeably with "cell."

The TRPs 508 may be a distributed unit (DU). The TRPs may be connected to one ANC (ANC 502) or more than one ANC (not illustrated). For example, for RAN sharing, radio as a service (RaaS), and service specific AND deployments, the TRP may be connected to more than one ANC. A TRP may include one or more antenna ports. The TRPs may be configured to individually (e.g., dynamic selection) or jointly (e.g., joint transmission) serve traffic to a UE.

The local architecture of RAN 500 may be used to illustrate fronthaul communication. The architecture may be defined to support fronthauling solutions across different deployment types. For example, the architecture may be based at least in part on transmit network capabilities (e.g., bandwidth, latency, and/or jitter).

The architecture may share features and/or components with LTE. According to aspects, the next generation AN (NG-AN) 510 may support dual connectivity with NR. The NG-AN may share a common fronthaul for LTE and NR.

The architecture may enable cooperation between and among TRPs 508. For example, cooperation may be preset within a TRP and/or across TRPs via the ANC 502. According to aspects, no inter-TRP interface may be needed/present.

According to aspects, a dynamic configuration of split logical functions may be present within the architecture of RAN 500. The packet data convergence protocol (PDCP), radio link control (RLC), or medium access control (MAC) protocol may be adaptably placed at the ANC or TRP.

According to various aspects, a BS may include a central unit (CU) (e.g., ANC 502) and/or one or more distributed units (e.g., one or more TRPs 508).

As indicated above, FIG. 5 is provided as an example. Other examples may differ from what is described with regard to FIG. 5.

Figure 6:
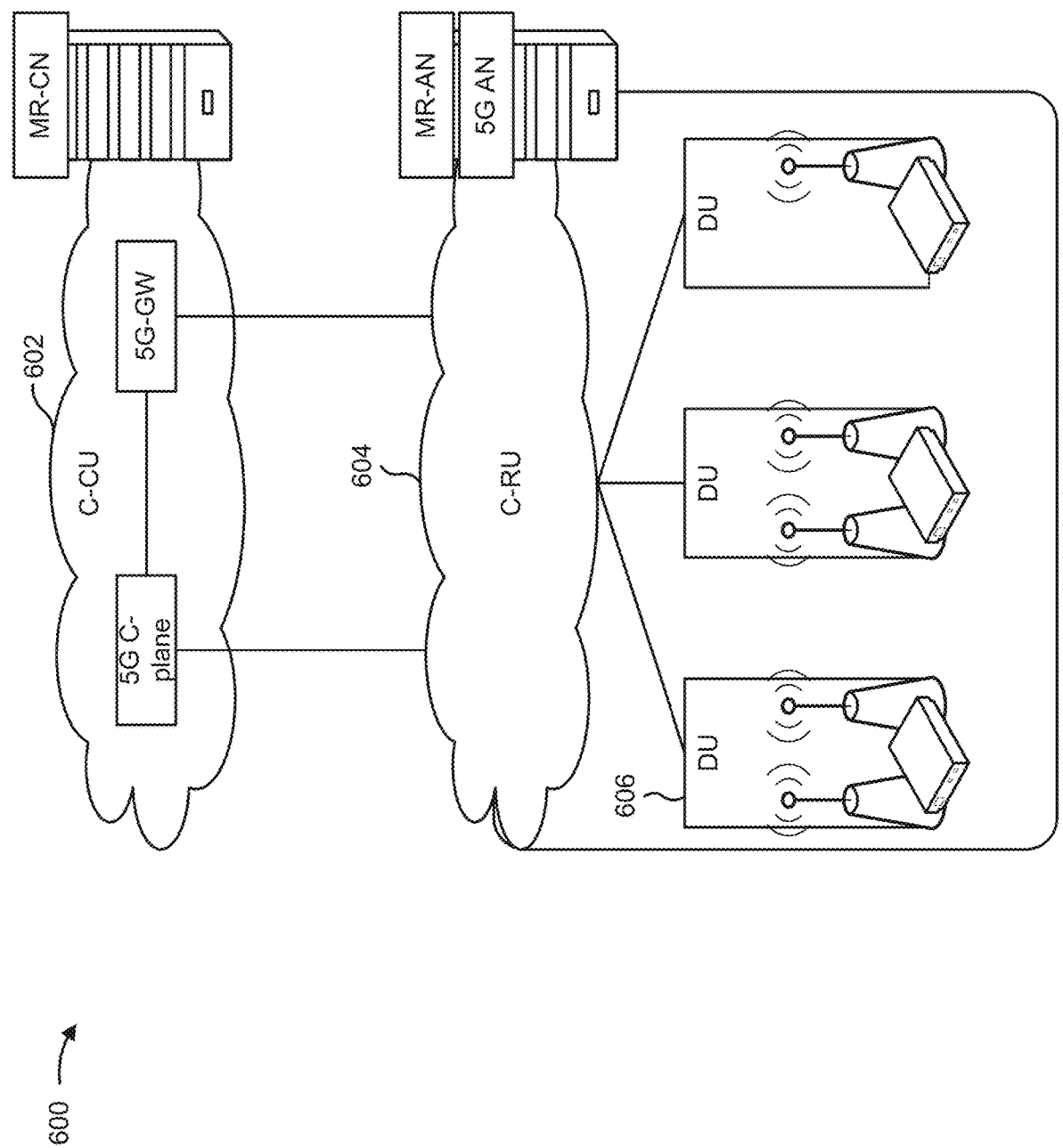
FIG. 6 illustrates an example physical architecture of a distributed RAN, in accordance with various aspects of the present disclosure.

FIG. 6 illustrates an example physical architecture of a distributed RAN 600, according to aspects of the present disclosure. A centralized core network unit (C-CU) 602 may host core network functions. The C-CU may be centrally deployed. C-CU functionality may be offloaded (e.g., to advanced wireless services (AWS)), in an effort to handle peak capacity.

A centralized RAN unit (C-RU) 604 may host one or more ANC functions. Optionally, the C-RU may host core network functions locally. The C-RU may have distributed deployment. The C-RU may be closer to the network edge.

A distributed unit (DU) 606 may host one or more TRPs. The DU may be located at edges of the network with radio frequency (RF) functionality.

As indicated above, FIG. 6 is provided as an example. Other examples may differ from what is described with regard to FIG. 6.

In some wireless communication systems, the functionality of a base station, such as a gNB, may be split between a CU and one or more DUs. Furthermore, the functionality of the CU may be further split between a control plane CU (CU-CP) and a user plane CU (CU-UP). In some cases, a CU-CP, one or more CU-UPs, and one or more DUs of an IAB donor may perform IAB operations. For example, one or more IAB nodes may connect to a network via a DU that supports IAB, thereby extending a coverage area of the network.

However, in current wireless communication systems, a CU-CP may lack information regarding an IAB capability of a DU and/or a CU-UP that has established a connection with the CU-CP. Similarly, a DU and/or a CU-UP may lack information regarding an IAB capability of a CU-CP to which the DU and/or the CU-UP has established a connection. For example, some DUs, CU-UPs, and/or CU-CPs may not support IAB, and therefore IAB capability cannot be assumed. As a result, IAB operations of the DU and/or the CU-UP (e.g., IAB operations that facilitate extension of a coverage area) may be unutilized even when the DU and/or the CU-UP supports IAB.

Some aspects described herein provide techniques and apparatuses for indicating IAB capability among nodes (e.g., logical nodes) of a base station. For example, a DU and a CU-CP may provide indications of IAB capability to each other, to thereby establish an IAB capable connection. Similarly, a CU-UP and a CU-CP may provide indications of IAB capability to each other, to thereby establish an IAB capable connection. In this way, IAB operations of the DU and/or the CU-UP may be utilized (e.g., to extend coverage via IAB nodes) based at least in part on the establishment of an IAB capable connection.

FIG. 7A is a diagram illustrating an example 700 of IAB capability indication, in accordance with various aspects of the present disclosure. As shown in FIG. 7A, nodes (e.g., logical nodes) of a base station (e.g., BS 110) may communicate to establish an IAB capable connection. In some aspects, a first node may be a DU and a second node may be a CU-CP. The base station may be a gNB. In some aspects, the base station, such as the gNB, may be an IAB donor of an IAB network.

As shown in FIG. 7A, and by reference number 702, the DU may transmit, and the CU-CP may receive, an indication of IAB capability. The indication of IAB capability may be included in a first message that is transmitted from the DU to the CU-CP. The DU may transmit the first message based at least in part on a determination that the DU is configured to support IAB.

In some aspects, the first message may be included in a procedure for establishing a connection between the DU and the CU-CP. For example, the DU may initiate a setup procedure for establishing a connection with the CU-CP, and the first message may be a message of the setup procedure. In some aspects, the setup procedure may be an F1 setup procedure or an F1 startup and cells activation procedure. In such cases, the first message may be an F1 setup request message and/or the like.

In some aspects, the first message may be included in a procedure for updating a configuration of the DU. For example, the DU may initiate a configuration update procedure, and the first message may be a message of the configuration update procedure. In some aspects, the configuration update procedure may be a DU configuration update procedure, and the first message may be a DU configuration update message. Additionally, or alternatively, the first message may be included in a procedure for indicating a status of the DU. For example, the DU may initiate a status indication procedure, and the first message may be a status indication message.

In some aspects, the DU may transmit a repeat indication of IAB capability. That is, the DU may transmit the repeat indication of IAB capability after previously establishing an IAB capable connection with the CU-CP. Accordingly, an IAB capable connection may be renewed or reestablished, such as when the DU and/or the CU-CP is reconfigured or replaced. In some aspects, the first message may include the repeat indication of IAB capability. In such a case, the first message may be a message of a transport network layer associations (TNLA) establishment procedure. For example, the first message may be an F1 setup request message and/or the like.

In addition to the indication of IAB capability, in some aspects, the first message may indicate one or more IAB capabilities of the DU. For example, the first message may indicate at least one of an air interface capacity of the DU, a number of supported backhaul radio link control channels of the DU, and/or the like.

As shown by reference number 704, the CU-CP may transmit, and the DU may receive an indication of IAB capability. The indication of IAB capability may be included in a second message that is transmitted from the CU-CP to the DU. The CU-CP may transmit the second message in response to the first message transmitted by the DU, and based at least in part on a determination that the CU-CP is configured to support IAB.

The CU-CP may transmit the second message as part of the procedure in which the DU transmitted the first message. That is, the CU-CP may transmit the second message after the first message, and as part of the same procedure that included the first message. For example, if the procedure is an F1 setup procedure or an F1 startup and cells activation procedure, the second message may be an F1 setup response message, a CU configuration update message, and/or the like. As a further example, if the procedure is a DU configuration update procedure, the second message may be a DU configuration update acknowledgment (ACK) message. As an additional example, if the procedure is a TNLA establishment procedure, the second message may be an F1 setup response message, a CU configuration update message, and/or the like.

In addition to the indication of IAB capability, in some aspects, the second message may indicate one or more IAB capabilities of the CU-CP. For example, the second message may indicate at least one of an air interface capacity of the CU-CP, a number of supported backhaul radio link control channels of the CU-CP, and/or the like.

As shown by reference number 706, the DU may establish an IAB capable connection with the CU-CP. For example, the DU may establish the IAB capable connection based at least in part on the first message and the second message indicating IAB capability. In some aspects, the DU may establish the IAB capable connection by activating an IAB functionality of the DU for communications with the CU-CP. Similarly, the CU-CP may activate an IAB functionality of the CU-CP for communications with the DU.

In some aspects, after establishing the IAB capable connection, or as a part of establishing the IAB capable connection, the CU-CP may transmit, and the DU may receive, an IAB configuration to enable IAB communications between the DU and the CU-CP.

As indicated above, FIG. 7A is provided as an example. Other examples may differ from what is described with respect to FIG. 7A.

Figure 7B:
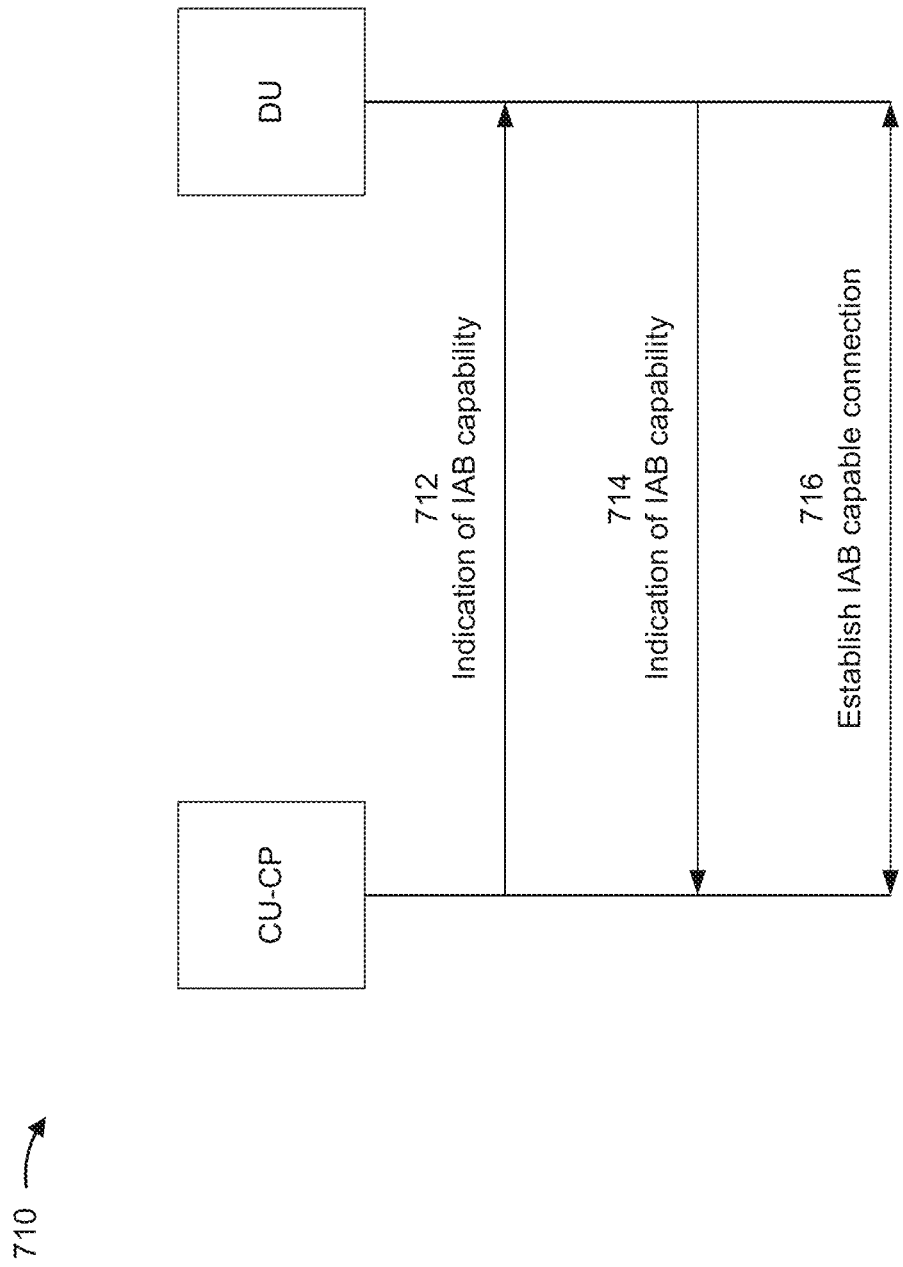

FIG. 7B is a diagram illustrating an example 710 of IAB capability indication, in accordance with various aspects of the present disclosure. As shown in FIG. 7B, nodes (e.g., logical nodes) of a base station (e.g., BS 110) may communicate to establish an IAB capable connection. In some aspects, a first node may be a CU-CP and a second node may be a DU. The base station may be a gNB. In some aspects, the base station, such as the gNB, may be an IAB donor of an IAB network.

As shown in FIG. 7B, and by reference number 712, the CU-CP may transmit, and the DU may receive, an indication of IAB capability. The indication of IAB capability may be included in a first message that is transmitted from the CU-CP to the DU. In some aspects, the first message may be a message of an F1 setup procedure, an F1 startup and cells activation procedure, or a TNLA establishment procedure, as described above. For example, the first message may be an F1 setup response message, a CU configuration update message, and/or the like. In some aspects, the first message may be a message of a CU configuration update procedure initiated by the CU-CP. For example, the first message may be a CU configuration update message.

The CU-CP may transmit the first message based at least in part on a determination that the CU-CP is configured to support IAB. In some aspects, the CU-CP may transmit the first message in response to an initiation, by the DU, of a procedure for establishing a connection between the DU and the CU-CP. In some aspects, the CU-CP may transmit the first message in response to an initiation, by the DU or the CU-CP, of a procedure for updating a configuration of the DU or the CU, or a procedure for TNLA establishment. In addition to the indication of IAB capability, in some aspects, the first message may indicate one or more IAB capabilities of the CU-CP, as described above in connection with FIG. 7A.

As shown by reference number 714, the DU may transmit, and the CU-CP may receive, an indication of IAB capability. The indication of IAB capability may be included in a second message that is transmitted from the DU to the CU-CP. The DU may transmit the second message in response to the first message transmitted by the CU-CP, and based at least in part on a determination that the DU is configured to support IAB.

The DU may transmit the second message as part of the procedure in which the CU-CP transmitted the first message. That is, the DU may transmit the second message after the first message, and as part of the same procedure that included the first message. For example, if the procedure is an F1 setup procedure, an F1 startup and cells activation procedure, or a TNLA establishment procedure, the second message may be a CU configuration update ACK message and/or the like. As another example, if the procedure is a CU configuration update procedure, the second message may be a CU configuration update ACK message and/or the like.

As shown by reference number 716, the CU-CP may establish an IAB capable connection with the DU. For example, the CU-CP may establish the IAB capable connection based at least in part on the first message and the second message indicating IAB capability, as described above in connection with FIG. 7A. Moreover, after establishing the IAB capable connection, or as a part of establishing the IAB capable connection, the CU-CP may transmit, and the DU may receive, an IAB configuration to enable IAB communications between the DU and the CU-CP.

As indicated above, FIG. 7B is provided as an example. Other examples may differ from what is described with respect to FIG. 7B.

Figure 7C:
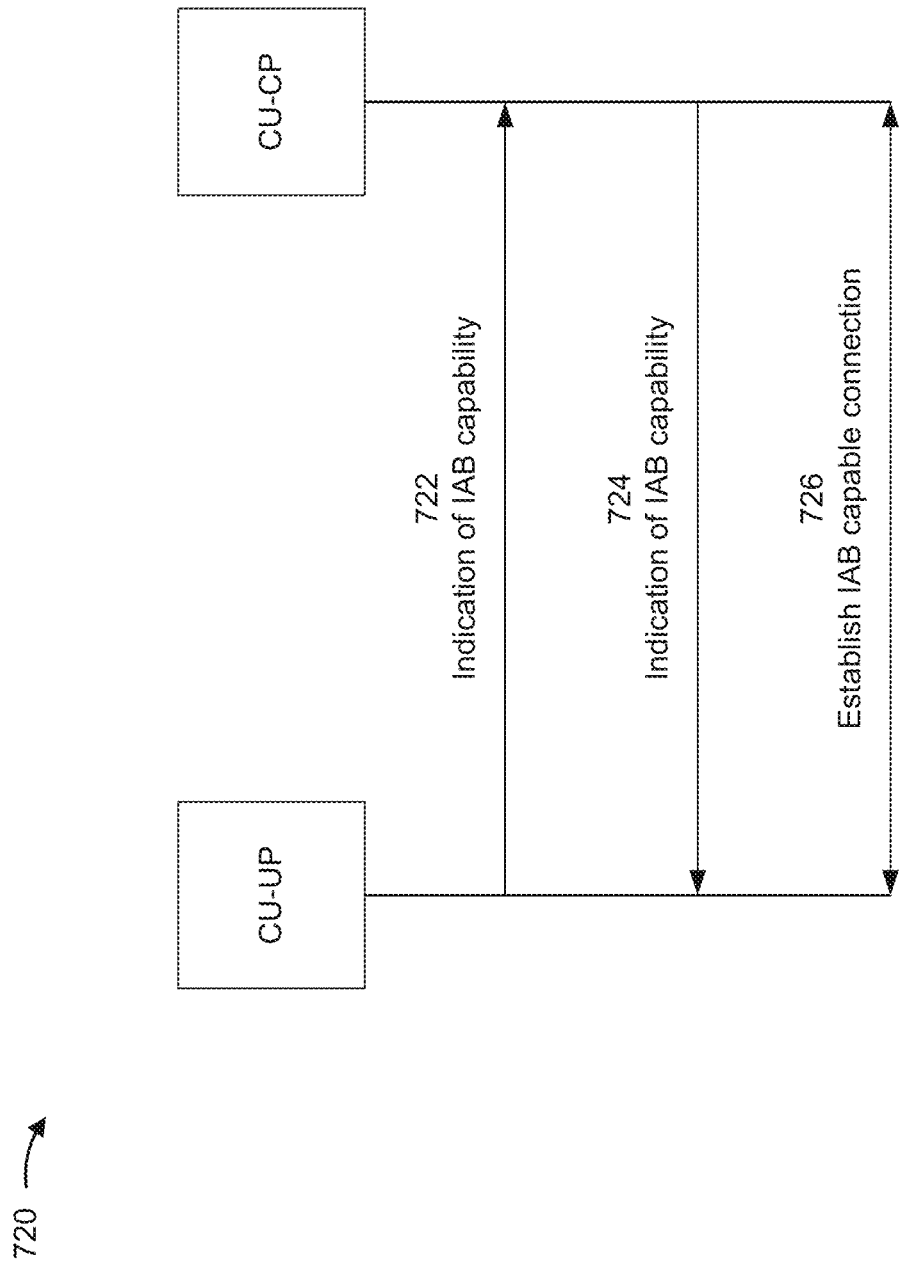

FIG. 7C is a diagram illustrating an example 720 of IAB capability indication, in accordance with various aspects of the present disclosure. As shown in FIG. 7C, nodes (e.g., logical nodes) of a base station (e.g., BS 110) may communicate to establish an IAB capable connection. In some aspects, a first node may be a CU-UP and a second node may be a CU-CP. The base station may be a gNB. In some aspects, the base station, such as the gNB, may be an IAB donor of an IAB network.

As shown in FIG. 7C, and by reference number 722, the CU-UP may transmit, and the CU-CP may receive, an indication of IAB capability. The indication of IAB capability may be included in a first message that is transmitted from the CU-UP to the CU-CP. The CU-UP may transmit the first message based at least in part on a determination that the CU-UP is configured to support IAB.

In some aspects, the first message may be included in a procedure for establishing a connection between the CU-UP and the CU-CP. For example, the CU-UP or the CU-CP may initiate a setup procedure for a connection between the CU-UP and CU-CP, and the first message may be a message of the setup procedure. In some aspects, the setup procedure may be an E1 setup procedure, and the first message may be an E1 setup request message (e.g., if the E1 setup procedure is initiated by the CU-UP), an E1 setup response message (e.g., if the E1 setup procedure is initiated by the CU-CP), a CU configuration update message (e.g., if the E1 setup procedure is initiated by the CU-CP), and/or the like.

In addition to the indication of IAB capability, in some aspects, the first message may indicate one or more IAB capabilities of the CU-UP. For example, the first message may indicate at least one of an air interface capacity of the CU-UP, a number of supported backhaul radio link control channels of the CU-UP, and/or the like.

As shown by reference number 724, the CU-CP may transmit, and the CU-UP may receive, an indication of IAB capability. The indication of IAB capability may be included in a second message that is transmitted from the CU-CP to the CU-UP. The CU-CP may transmit the second message in response to the first message transmitted by the CU-UP, and based at least in part on a determination that the CU-UP is configured to support IAB.

The CU-CP may transmit the second message as part of the procedure in which the CU-UP transmitted the first message. That is, the CU-CP may transmit the second message after the first message as part of the same procedure that includes the first message. For example, if the procedure is an E1 setup procedure initiated by the CU-UP, the second message may be an E1 setup response message, a CU configuration update message, and/or the like. As another example, if the procedure is an E1 setup procedure initiated by the CU-CP, the second message may be a CU configuration ACK message.

In addition to the indication of IAB capability, in some aspects, the second message may indicate one or more IAB capabilities of the CU-CP, a described above in connection with FIG. 7A.

As shown by reference number 726, the CU-UP may establish an IAB capable connection with the CU-CP. For example, the CU-UP may establish the IAB capable connection based at least in part on the first message and the second message indicating IAB capability. In some aspects, the CU-UP may establish the IAB capable connection by activating an IAB functionality of the CU-UP for communications with the CU-CP. Similarly, the CU-CP may activate an IAB functionality of the CU-CP for communications with the CU-UP.

In some aspects, after establishing the IAB capable connection, or as a part of establishing the IAB capable connection, the CU-CP may transmit, and the CU-UP may receive, an IAB configuration to enable IAB communications between the CU-UP and the CU-CP.

As indicated above, FIG. 7C is provided as an example. Other examples may differ from what is described with respect to FIG. 7C.

Figure 7D:
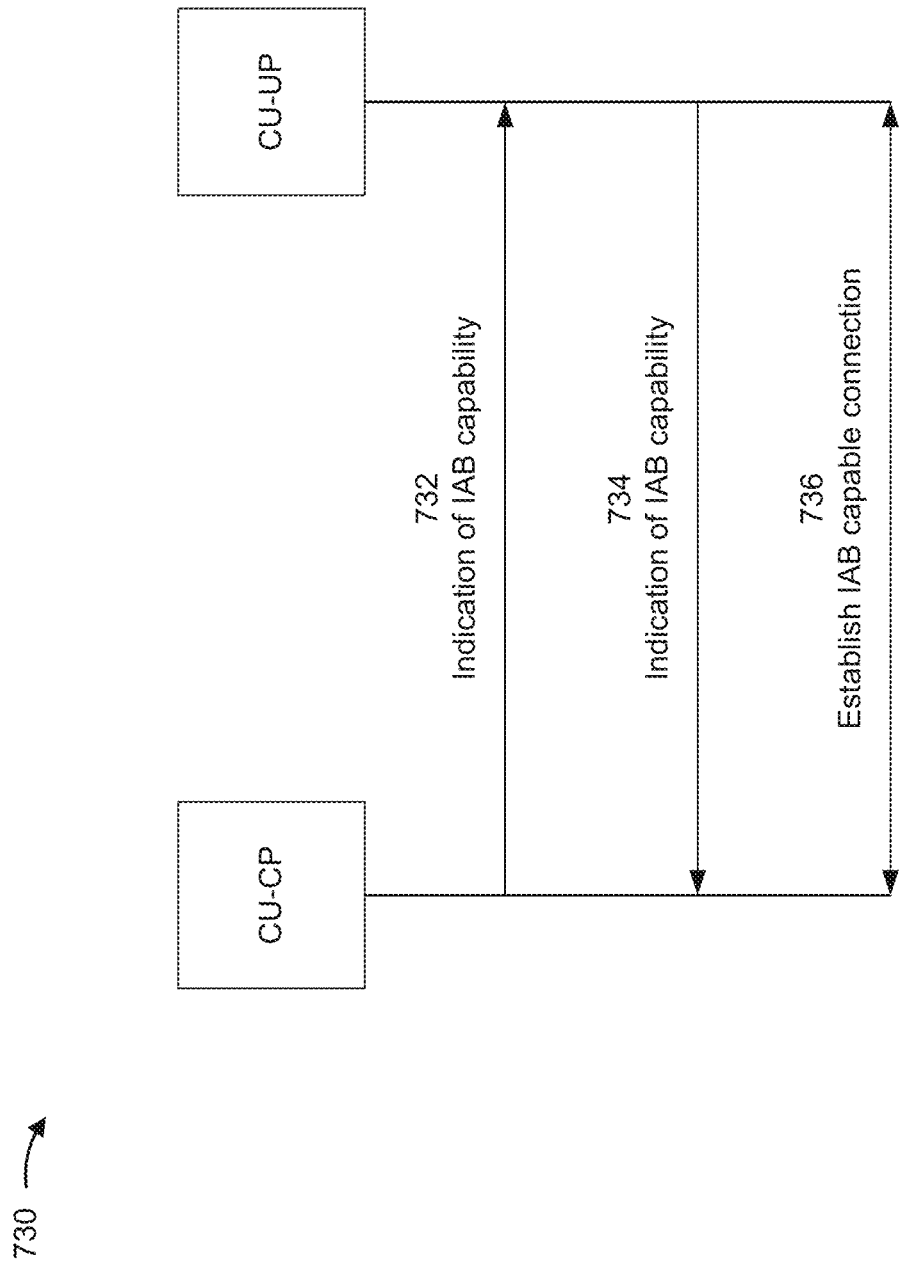

FIG. 7D is a diagram illustrating an example 730 of IAB capability indication, in accordance with various aspects of the present disclosure. As shown in FIG. 7D, nodes (e.g., logical nodes) of a base station (e.g., BS 110) may communicate to establish an IAB capable connection. In some aspects, a first node may be a CU-CP and a second node may be a CU-UP. The base station may be a gNB. In some aspects, the base station, such as the gNB, may be an IAB donor of an IAB network.

As shown in FIG. 7D, and by reference number 732, the CU-CP may transmit, and the CU-UP may receive, an indication of IAB capability. The indication of IAB capability may be included in a first message that is transmitted from the CU-CP to the CU-UP. The CU-CP may transmit the first message based at least in part on a determination that the CU-CP is configured to support IAB. In some aspects, the CU-UP or the CU-CP may initiate a setup procedure for a connection between the CU-UP and CU-CP, and the first message may be an be an E1 setup request message (e.g., if the E1 setup procedure is initiated by the CU-CP), an E1 setup response message (e.g., if the E1 setup procedure is initiated by the CU-UP), a CU configuration update message (e.g., if the E1 setup procedure is initiated by the CU-UP), and/or the like. In addition to the indication of IAB capability, in some aspects, the first message may indicate one or more IAB capabilities of the CU-CP, as described above in connection with FIG. 7A.

As shown by reference number 734, the CU-UP may transmit, and the CU-CP may receive, an indication of IAB capability. The indication of IAB capability may be included in a second message that is transmitted from the CU-UP to the CU-CP. The CU-UP may transmit the second message in response to the first message transmitted by the CU-CP, and based at least in part on a determination that the CU-UP is configured to support IAB. The CU-CP may transmit the second message as part of the procedure in which the CU-UP transmitted the first message. For example, if the procedure is an E1 setup procedure initiated by the CU-CP, the second message may be an E1 setup response message, a CU configuration update message, and/or the like. As another example, if the procedure is an E1 setup procedure initiated by the CU-UP, the second message may be a CU configuration ACK message.

As shown by reference number 736, the CU-CP may establish an IAB capable connection with the CU-UP. For example, the CU-CP may establish the IAB capable connection based at least in part on the first message and the second message indicating IAB capability, as described above in connection with FIG. 7C. Moreover, after establishing the IAB capable connection, or as a part of establishing the IAB capable connection, the CU-CP may transmit, and the CU-UP may receive, an IAB configuration to enable IAB communications between the CU-UP and the CU-CP.

As indicated above, FIG. 7D is provided as an example. Other examples may differ from what is described with respect to FIG. 7D.

Figure 8:
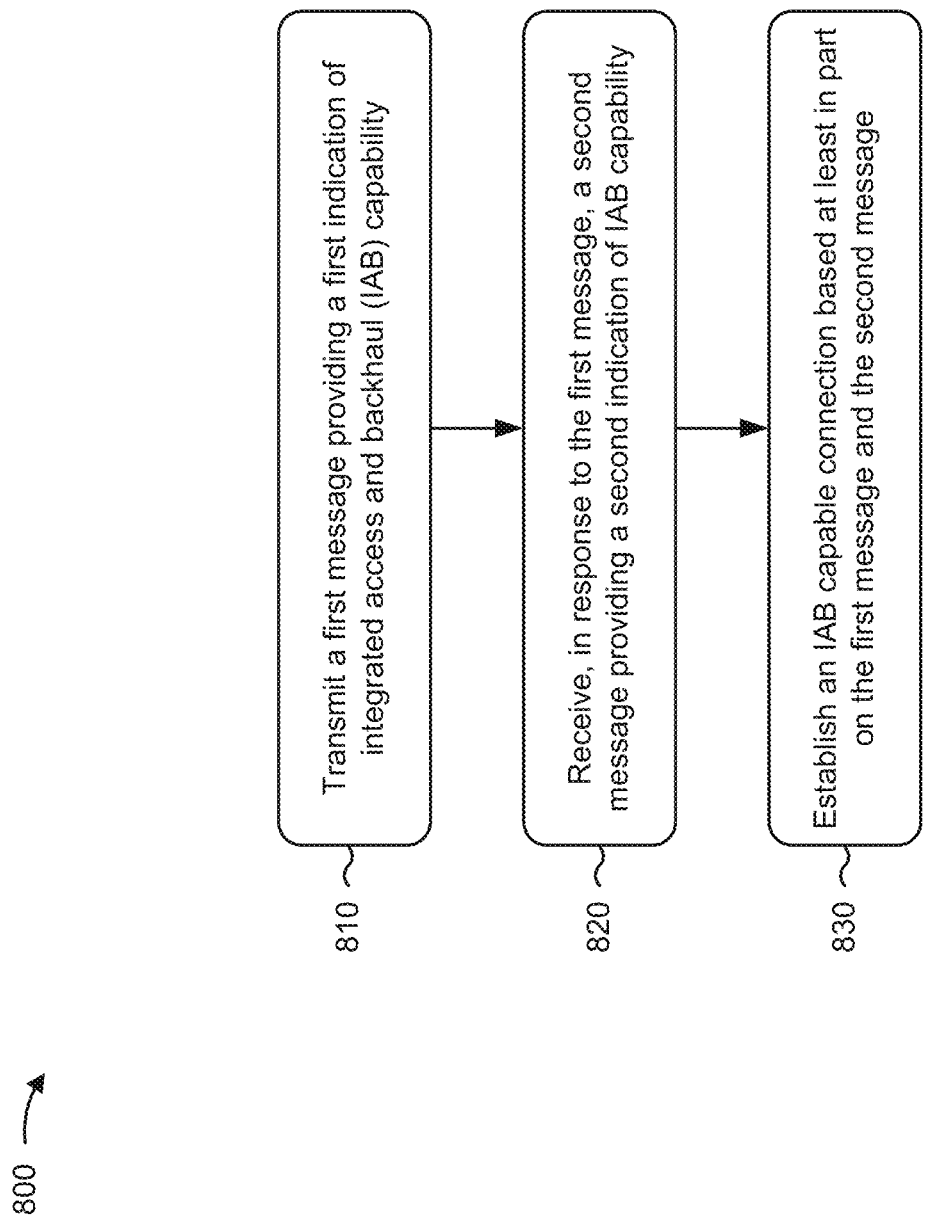
FIGS. 8 and 9 are diagrams illustrating example processes performed, for example, by nodes of a base station, in accordance with various aspects of the present disclosure.

FIG. 8 is a diagram illustrating an example process 800 performed, for example, by a node, in accordance with various aspects of the present disclosure. Example process 800 is an example where a node (e.g., a DU, a CU-CP, a CU-UP, and/or the like) performs operations associated with IAB capability indication.

As shown in FIG. 8, in some aspects, process 800 may include transmitting a first message providing a first indication of IAB capability (block 810). For example, the node (e.g., using controller/processor 240, transmit processor 220, TX MIMO processor 230, MOD 232, antenna 234, transmission component 1004, and/or the like) may transmit a first message providing a first indication of IAB capability, as described above.

As further shown in FIG. 8, in some aspects, process 800 may include receiving, in response to the first message, a second message providing a second indication of IAB capability (block 820). For example, the node (e.g., using antenna 234, DEMOD 232, MIMO detector 236, receive processor 238, controller/processor 240, reception component 1006, and/or the like) may receive, in response to the first message, a second message providing a second indication of IAB capability, as described above.

As further shown in FIG. 8, in some aspects, process 800 may include establishing an IAB capable connection based at least in part on the first message and the second message (block 830). For example, the node (e.g., using controller/processor 240, IAB establishment component 1008, and/or the like) may establish an IAB capable connection based at least in part on the first message and the second message, as described above.

Process 800 may include additional aspects, such as any single aspect or any combination of aspects described below and/or in connection with one or more other processes described elsewhere herein.

In a first aspect, the node is a node of an IAB donor.

In a second aspect, alone or in combination with the first aspect, the first message or the second message further identifies one or more IAB capabilities. In a third aspect, alone or in combination with one or more of the first and second aspects, the one or more IAB capabilities include one or more of an air interface capacity, or a number of supported backhaul radio link control channels.

In a fourth aspect, alone or in combination with one or more of the first through third aspects, establishing the IAB capable connection includes activating IAB functionality for communications with the second node. In a fifth aspect, alone or in combination with one or more of the first through fourth aspects, process 800 further includes transmitting an IAB configuration based at least in part on establishing the IAB capable connection.

In a sixth aspect, alone or in combination with one or more of the first through fifth aspects, the first node is a distributed unit and the second node is a control-plane central unit. In a seventh aspect, alone or in combination with one or more of the first through sixth aspects, the first node is a control-plane central unit and the second node is a distributed unit. In an eighth aspect, alone or in combination with one or more of the first through seventh aspects, the first node is a user-plane central unit and the second node is a control-plane central unit. In a ninth aspect, alone or in combination with one or more of the first through eighth aspects, the first node is a control-plane central unit and the second node is a user-plane central unit.

In a tenth aspect, alone or in combination with one or more of the first through ninth aspects, the first message or the second message is at least one of a message of an F1 startup and cells activation procedure, or a message of a transport network layer associations establishment procedure. In an eleventh aspect, alone or in combination with one or more of the first through tenth aspects, the first message or the second message is at least one of a message of an F1 setup procedure, a message of an F1 configuration update procedure, or a message of an F1 status indication procedure. In a twelfth aspect, alone or in combination with one or more of the first through eleventh aspects, the first message or the second message is a message of an E1 setup procedure.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

Figure 9:
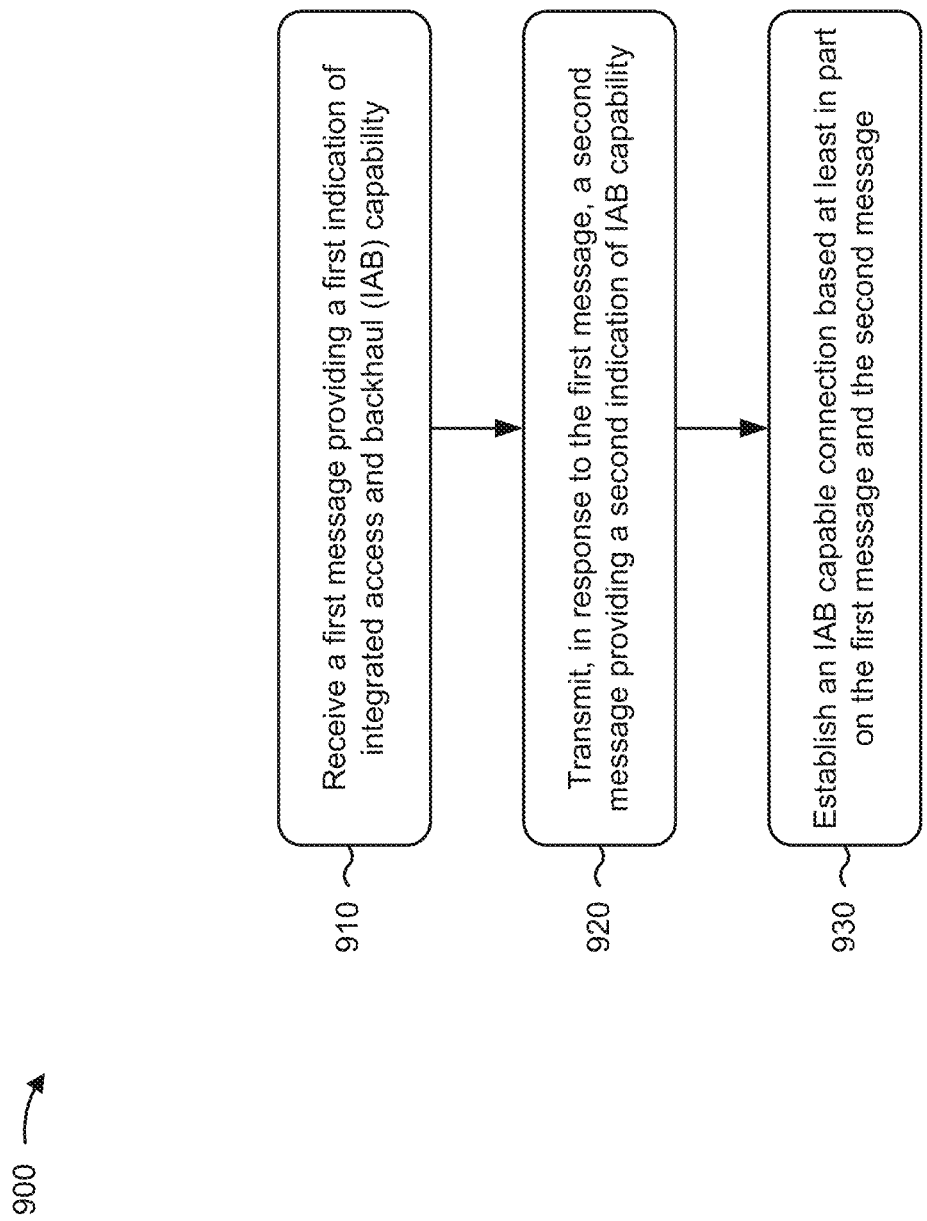

FIG. 9 is a diagram illustrating an example process 900 performed, for example, by a node, in accordance with various aspects of the present disclosure. Example process 900 is an example where a node (e.g., a DU, a CU-CP, a CU-UP, and/or the like) performs operations associated with IAB capability indication.

As shown in FIG. 9, in some aspects, process 900 may include receiving a first message providing a first indication of IAB capability (block 910). For example, the node (e.g., using antenna 234, DEMOD 232, MIMO detector 236, receive processor 238, controller/processor 240, reception component 1104, and/or the like) may receive a first message providing a first indication of IAB capability, as described above.

As further shown in FIG. 9, in some aspects, process 900 may include transmitting, in response to the first message, a second message providing a second indication of IAB capability (block 920). For example, the node (e.g., using controller/processor 240, transmit processor 220, TX MIMO processor 230, MOD 232, antenna 234, transmission component 1106, and/or the like) may transmit, in response to the first message, a second message providing a second indication of IAB capability, as described above.

As further shown in FIG. 9, in some aspects, process 900 may include establishing an IAB capable connection based at least in part on the first message and the second message (block 930). For example, the node (e.g., using controller/processor 240, IAB establishment component 1108, and/or the like) may establish an IAB capable connection based at least in part on the first message and the second message, as described above.

Process 900 may include additional aspects, such as any single aspect or any combination of aspects described below and/or in connection with one or more other processes described elsewhere herein.

In a first aspect, the node is a node of an IAB donor.

In a second aspect, alone or in combination with the first aspect, the first message or the second message further identifies one or more IAB capabilities. In a third aspect, alone or in combination with one or more of the first and second aspects, the one or more IAB capabilities include one or more of an air interface capacity, or a number of supported backhaul radio link control channels.

In a fourth aspect, alone or in combination with one or more of the first through third aspects, establishing the IAB capable connection includes activating IAB functionality for communications with the second node. In a fifth aspect, alone or in combination with one or more of the first through fourth aspects, process 900 further includes transmitting an IAB configuration based at least in part on establishing the IAB capable connection.

In a sixth aspect, alone or in combination with one or more of the first through fifth aspects, the first node is a distributed unit and the second node is a control-plane central unit. In a seventh aspect, alone or in combination with one or more of the first through sixth aspects, the first node is a control-plane central unit and the second node is a distributed unit. In an eighth aspect, alone or in combination with one or more of the first through seventh aspects, the first node is a user-plane central unit and the second node is a control-plane central unit. In a ninth aspect, alone or in combination with one or more of the first through eighth aspects, the first node is a control-plane central unit and the second node is a user-plane central unit.

In a tenth aspect, alone or in combination with one or more of the first through ninth aspects, the first message or the second message is at least one of a message of an F1 startup and cells activation procedure, or a message of a transport network layer associations establishment procedure. In an eleventh aspect, alone or in combination with one or more of the first through tenth aspects, the first message or the second message is at least one of a message of an F1 setup procedure, a message of an F1 configuration update procedure, or a message of an F1 status indication procedure. In a twelfth aspect, alone or in combination with one or more of the first through eleventh aspects, the first message or the second message is a message of an E1 setup procedure.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

Figure 10:
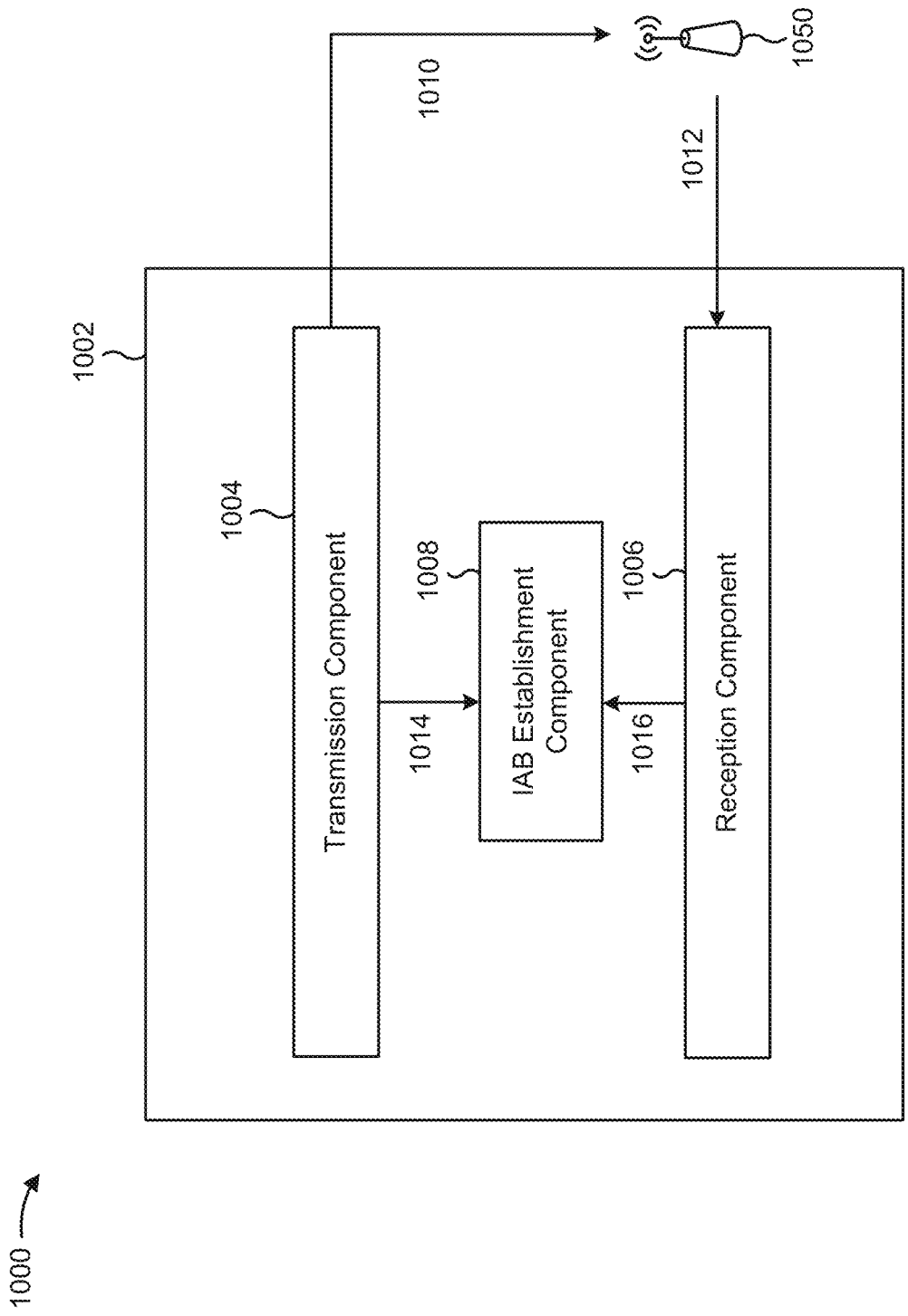
FIGS. 10 and 11 are diagrams illustrating data flows between different modules/means/components in example apparatuses, in accordance with various aspects of the present disclosure.

FIG. 10 is a diagram 1000 illustrating a data flow between different modules/means/components in an example apparatus 1002. The apparatus 1002 may be a node (e.g., a DU, a CU-CP, a CU-UP, and/or the like). In some aspects, the apparatus 1002 includes a transmission component 1004, a reception component 1006, and/or an IAB establishment component 1008.

The transmission component 1004 may transmit, to a node 1050 (e.g., a DU, a CU-CP, a CU-UP, and/or the like) and as data 1010, a first message providing a first indication of IAB capability. For example, based at least in part on a determination of IAB capability, the transmission component 1004 may transmit a first message providing a first indication of IAB capability.

The reception component 1006 may receive, from the node 1050 and as data 1012, a second message providing a second indication of IAB capability. For example, based at least in part on a determination of IAB capability by the node 1050, the reception component 1006 may receive a second message providing a second indication of IAB capability. The reception component 1006 may receive the second message as a response to the first message.

The IAB establishment component 1008 may receive, from the transmission component 1004 and as data 1014, information associated with the first message. For example, based at least in part on the first message providing the first indication of IAB capability, the IAB establishment component 1008 may receive, from the transmission component 1004, information identifying that the first message provides the first indication of IAB capability. In addition, the IAB establishment component 1008 may receive, from the reception component 1006 and as data 1016, information associated with the second message. For example, based at least in part on the second message providing the second indication of IAB capability, the IAB establishment component 1008 may receive, from the reception component 1006, information identifying that the second message provides the second indication of IAB capability. The IAB establishment component 1008 may establish an IAB capable connection with the node 1050 based at least in part on the information associated with the first message and the information associated with the second message.

The apparatus 1002 may include additional components that perform each of the blocks of the algorithm in the aforementioned process 800 of FIG. 8, and/or the like. Each block in the aforementioned process 800 of FIG. 8, and/or the like, may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

The number and arrangement of components shown in FIG. 10 are provided as an example. In practice, there may be additional components, fewer components, different components, or differently arranged components than those shown in FIG. 10. Furthermore, two or more components shown in FIG. 10 may be implemented within a single component, or a single component shown in FIG. 10 may be implemented as multiple, distributed components. Additionally, or alternatively, a set of components (e.g., one or more components) shown in FIG. 10 may perform one or more functions described as being performed by another set of components shown in FIG. 10.

Figure 11:
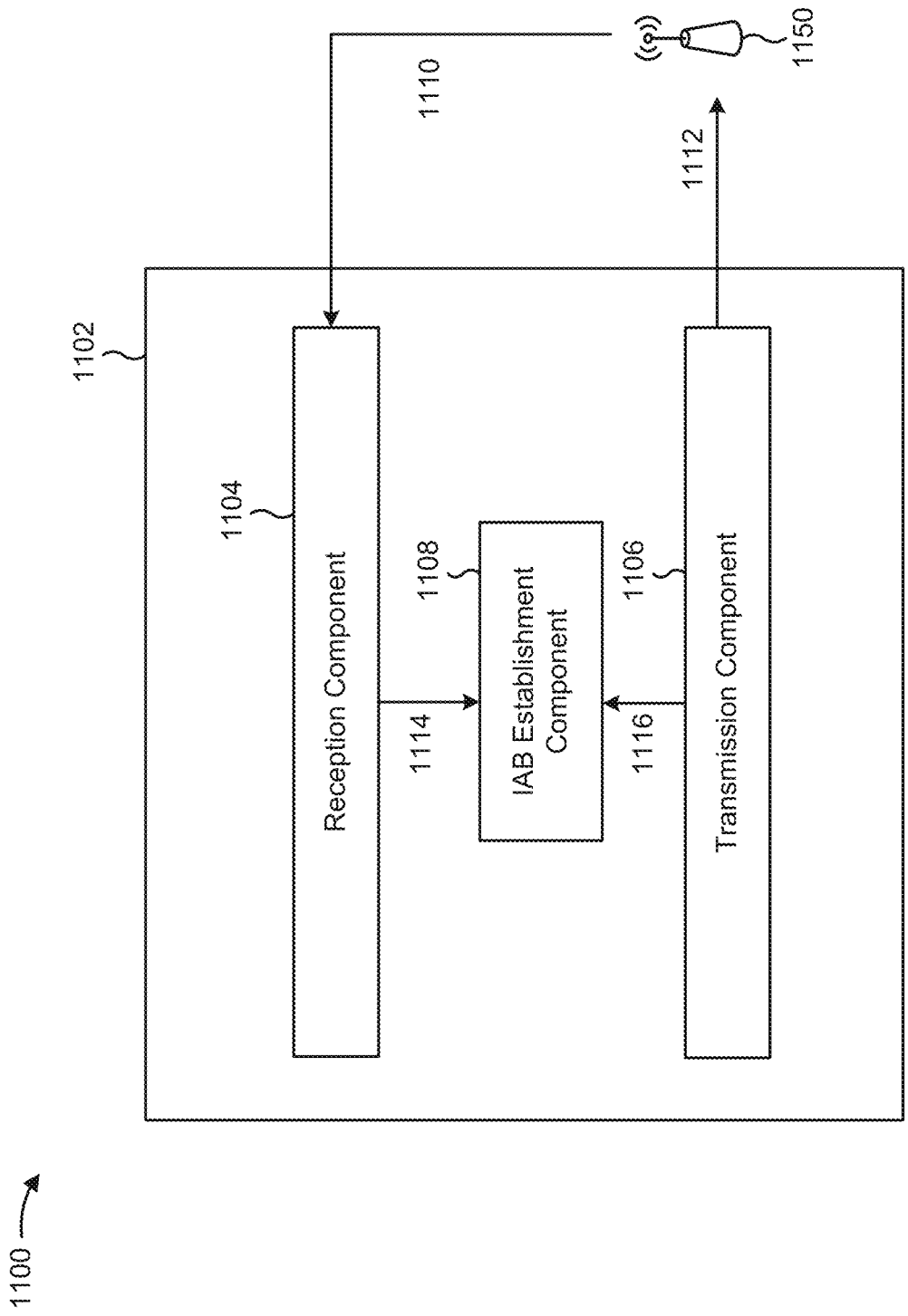

FIG. 11 is a diagram 1100 illustrating a data flow between different modules/means/components in an example apparatus 1102. The apparatus 1102 may be a node (e.g., a DU, a CU-CP, a CU-UP, and/or the like). In some aspects, the apparatus 1102 includes a reception component 1104, a transmission component 1106, and/or an IAB establishment component 1108.

The reception component 1104 may receive, from a node 1150 (e.g., a DU, a CU-CP, a CU-UP, and/or the like) and as data 1110, a first message providing a first indication of IAB capability. For example, based at least in part on a determination of IAB capability by the node 1150, the reception component 1104 may receive a first message providing a first indication of IAB capability.

The transmission component 1106 may transmit, to the node 1150 and as data 1112, a second message providing a second indication of IAB capability. For example, based at least in part on a determination of IAB capability, the transmission component 1106 may transmit a second message providing a second indication of IAB capability. The transmission component 1106 may transmit the second message as a response to receiving the first message.

The IAB establishment component 1108 may receive, from the reception component 1104 and as data 1114, information associated with the first message. For example, based at least in part on the first message providing the first indication of IAB capability, the IAB establishment component 1108 may receive, from the reception component 1104, information identifying that the first message provides the first indication of IAB capability. In addition, the IAB establishment component 1108 may receive, from the transmission component 1106 and as data 1116, information associated with the second message. For example, based at least in part on the second message providing the second indication of IAB capability, the IAB establishment component 1108 may receive, from the transmission component 1106, information identifying that the second message provides the second indication of IAB capability. The IAB establishment component 1108 may establish an IAB capable connection with the node 1050 based at least in part on the information associated with the first message and the information associated with the second message.

The apparatus 1102 may include additional components that perform each of the blocks of the algorithm in the aforementioned process 900 of FIG. 9, and/or the like. Each block in the aforementioned process 900 of FIG. 9, and/or the like, may be performed by a component and the apparatus may include one or more of those components. The components may be one or more hardware components specifically configured to carry out the stated processes/ algorithm, implemented by a processor configured to perform the stated processes/algorithm, stored within a computer-readable medium for implementation by a processor, or some combination thereof.

The number and arrangement of components shown in FIG. 11 are provided as an example. In practice, there may be additional components, fewer components, different components, or differently arranged components than those shown in FIG. 11. Furthermore, two or more components shown in FIG. 11 may be implemented within a single component, or a single component shown in FIG. 11 may be implemented as multiple, distributed components. Additionally, or alternatively, a set of components (e.g., one or more components) shown in FIG. 11 may perform one or more functions described as being performed by another set of components shown in FIG. 11.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, and/or a combination of hardware and software. As used herein, a processor is implemented in hardware, firmware, and/or a combination of hardware and software.

As used herein, satisfying a threshold may, depending on the context, refer to a value being greater than the threshold, greater than or equal to the threshold, less than the threshold, less than or equal to the threshold, equal to the threshold, not equal to the threshold, and/or the like.

It will be apparent that systems and/or methods described herein may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A method of wireless communication performed by a first node of an integrated access and backhaul (IAB) donor, comprising:
   transmitting, to a second node of the IAB donor, a first message providing a first indication of IAB capability of the first node,
      wherein the first message is an F1 setup request message;
   receiving, from the second node and in response to the first message, a second message providing a second indication of IAB capability of the second node,
      wherein the second message is an F1 setup response message; and
   establishing an IAB capable connection with the second node based at least in part on the first message and the second message.

2. The method of claim 1, wherein the first message or the second message further identifies one or more types of IAB capabilities.

3. The method of claim 2, wherein the one or more types of IAB capabilities include one or more of an air interface capacity, or a number of supported backhaul radio link control channels.

4. The method of claim 1, wherein establishing the IAB capable connection includes activating IAB functionality for communications with the second node.

5. The method of claim 1, further comprising transmitting an IAB configuration based at least in part on establishing the IAB capable connection.

6. The method of claim 1, wherein the first node is a distributed unit and the second node is a control-plane central unit.

7. The method of claim 1, wherein the first node is a control-plane central unit and the second node is a distributed unit.

8. The method of claim 1, wherein the first node is a user-plane central unit and the second node is a control-plane central unit.

9. The method of claim 1, wherein the first node is a control-plane central unit and the second node is a user-plane central unit.

10. The method of claim 1, wherein at least one of the first message or the second message is associated with at least one of an F1 startup and cells activation procedure, or a transport network layer associations establishment procedure.

11. The method of claim 1, wherein at least one of the first message or the second message is associated with at least one of an F1 setup procedure, or an F1 configuration update procedure.

12. A first node of an integrated access and backhaul (IAB) donor for wireless communication, comprising:
   a memory; and
   one or more processors coupled to the memory, the one or more processors configured to:
      transmit, to a second node of the IAB donor, a first message providing a first indication of IAB capability of the first node,
         wherein the first message is an F1 setup request message;
      receive, from the second node and in response to the first message, a second message providing a second indication of IAB capability of the second node,
         wherein the second message is an F1 setup response message; and
      establish an IAB capable connection with the second node based at least in part on the first message and the second message.

13. The first node of claim 12, wherein the first message or the second message further identifies one or more types of IAB capabilities.

14. The first node of claim 13, wherein the one or more types of IAB capabilities include one or more of an air interface capacity, or a number of supported backhaul radio link control channels.

15. The first node of claim 12, wherein establishing the one or more processors, to establish the IAB capable connection, are configured to activate IAB functionality for communications with the second node.

16. The first node of claim 12, wherein the one or more processors are further configured to transmit an IAB configuration based at least in part on establishing the IAB capable connection.

17. The first node of claim 12, wherein the first node is a distributed unit and the second node is a control-plane central unit.

18. The first node of claim 12, wherein the first node is a control-plane central unit and the second node is a distributed unit.

19. The first node of claim 12, wherein the first node is a user-plane central unit and the second node is a control-plane central unit.

20. The first node of claim 12, wherein the first node is a control-plane central unit and the second node is a user-plane central unit.

21. The first node of claim 12, wherein at least one of the first message or the second message is associated with at least one of an F1 startup and cells activation procedure, or a transport network layer associations establishment procedure.

22. The first node of claim 12, wherein at least one of the first message or the second message is associated with at least one of an F1 setup procedure, or an F1 configuration update procedure.

23. A non-transitory computer-readable medium storing one or more instructions for wireless communication, the one or more instructions comprising:
   one or more instructions that, when executed by one or more processors of a first node of an integrated access and backhaul (IAB) donor, cause the first node to:
      transmit, to a second node of the IAB donor, a first message providing a first indication of IAB capability of the first node,
         wherein the first message is an F1 setup request message;
      receive, from the second node and in response to the first message, a second message providing a second indication of IAB capability of the second node,
         wherein the second message is an F1 setup response message; and
      establish an IAB capable connection with the second node based at least in part on the first message and the second message.

24. The non-transitory computer-readable medium of claim 23, wherein the first message or the second message further identifies one or more types of IAB capabilities.

25. The non-transitory computer-readable medium of claim 24, wherein the one or more types of IAB capabilities include one or more of an air interface capacity, or a number of supported backhaul radio link control channels.

26. The non-transitory computer-readable medium of claim 23, wherein the one or more instructions, that cause the first node to establish the IAB capable connection, are configured to activate IAB functionality for communications with the second node.

27. The non-transitory computer-readable medium of claim 23, wherein the one or more instructions further cause the first node to transmit an IAB configuration based at least in part on establishing the IAB capable connection.

28. The non-transitory computer-readable medium of claim 23, wherein the first node is a distributed unit and the second node is a control-plane central unit.

29. An apparatus of an integrated access and backhaul (IAB) donor for wireless communication, comprising:
  means for transmitting, to a node of the IAB donor, a first message providing a first indication of IAB capability of the apparatus,
    wherein the first message is an F1 setup request message;
  means for receiving, from the node and in response to the first message, a second message providing a second indication of IAB capability of the node,
    wherein the second message is an F1 setup response message; and
  means for establishing an IAB capable connection with the node based at least in part on the first message and the second message.

30. The apparatus of claim 29, wherein the first message or the second message further identifies one or more types of IAB capabilities.

31. A method of wireless communication performed by a first node of an integrated access and backhaul (IAB) donor, comprising:
  transmitting, to a second node of the IAB donor, a first message providing a first indication of IAB capability of the first node,
    wherein the first node is a distributed unit and the second node is a control-plane central unit, and
    wherein the first message is an F1 setup request message;
  receiving, from the second node and in response to the first message, a second message providing a second indication of IAB capability of the second node
    wherein the second message is an F1 setup response message; and
  establishing an IAB capable connection with the second node based at least in part on the first message and the second message,
    wherein the first message or the second message further identifies one or more types of IAB capabilities,
      wherein the one or more types of IAB capabilities include one or more of an air interface capacity, or a number of supported backhaul radio link control channels.

32. A first node of an integrated access and backhaul (IAB) donor for wireless communication, comprising:
  a memory; and
  one or more processors coupled to the memory, the one or more processors configured to:
    transmit, to a second node of the IAB donor, a first message providing a first indication of IAB capability of the first node,
      wherein the first node is a distributed unit and the second node is a control-plane central unit, and
      wherein the first message is an F1 setup request message;
    receive, from the second node and in response to the first message, a second message providing a second indication of IAB capability of the second node
      wherein the second message is an F1 setup response message; and
    establish an IAB capable connection with the second node based at least in part on the first message and the second message,
      wherein the first message or the second message further identifies one or more types of IAB capabilities,
        wherein the one or more types of IAB capabilities include one or more of an air interface capacity, or a number of supported backhaul radio link control channels.

* * * * *